US012624217B2

(12) United States Patent
Nguyen

(10) Patent No.: US 12,624,217 B2
(45) Date of Patent: May 12, 2026

(54) COATED PIGMENT AND METHOD OF MAKING

(71) Applicant: ECKART GMBH, Wesel (DE)

(72) Inventor: Phu Qui Nguyen, Leven Fife (GB)

(73) Assignee: ECKART GMBH, Hartenstein (DE)

( * ) Notice: Subject to any disclaimer, the term of this patent is extended or adjusted under 35 U.S.C. 154(b) by 635 days.

(21) Appl. No.: 17/424,851

(22) PCT Filed: Feb. 5, 2020

(86) PCT No.: PCT/GB2020/050262
§ 371 (c)(1),
(2) Date: Jul. 21, 2021

(87) PCT Pub. No.: WO2020/161490
PCT Pub. Date: Aug. 13, 2020

(65) Prior Publication Data
US 2022/0119645 A1     Apr. 21, 2022

(30) Foreign Application Priority Data

Feb. 5, 2019     (GB) ...................................... 1901574
Mar. 18, 2019     (GB) ...................................... 1903655

(51) Int. Cl.
| | |
|---|---|
| *C09C 1/64* | (2006.01) |
| *B05D 1/04* | (2006.01) |
| *B05D 7/14* | (2006.01) |
| *C09C 3/00* | (2006.01) |
| *C09C 3/06* | (2006.01) |
| *C09C 3/10* | (2006.01) |
| *C09C 3/12* | (2006.01) |
| *C09D 5/03* | (2006.01) |
| *C09D 7/40* | (2018.01) |
| *C09D 7/62* | (2018.01) |

(52) U.S. Cl.
CPC ................ *C09C 1/648* (2013.01); *B05D 1/04* (2013.01); *B05D 7/14* (2013.01); *C09C 3/006* (2013.01); *C09C 3/063* (2013.01); *C09C 3/10* (2013.01); *C09C 3/12* (2013.01); *C09D 5/035* (2013.01); *C09D 7/62* (2018.01); *C09D 7/70* (2018.01)

(58) Field of Classification Search
None
See application file for complete search history.

(56) References Cited

U.S. PATENT DOCUMENTS

| | | | |
|---|---|---|---|
| 4,321,087 A | 3/1982 | Levine et al. |
| 5,505,991 A | 4/1996 | Schmid et al. |
| 5,624,076 A | 4/1997 | Miekka et al. |
| 5,624,486 A | 4/1997 | Schmid et al. |
| 7,806,976 B2 | 10/2010 | Nakao |
| 9,139,715 B2 | 9/2015 | Sundararaman et al. |

| | | | |
|---|---|---|---|
| 2003/0051634 A1 | 3/2003 | Takahashi | |
| 2003/0097957 A1 | 5/2003 | Lamborn et al. | |
| 2004/0194663 A1 | 10/2004 | Li et al. | |
| 2004/0265348 A1* | 12/2004 | Hollenberg .............. A61K 8/11 | |
| | | | 424/401 |
| 2005/0204958 A1 | 9/2005 | Kuebelbeck et al. | |
| 2006/0014854 A1 | 1/2006 | Minami | |
| 2006/0015086 A1 | 1/2006 | Rasmussen et al. | |
| 2006/0118663 A1 | 6/2006 | Herzing | |
| 2007/0172692 A1 | 7/2007 | Kamimori et al. | |
| 2007/0199478 A1 | 8/2007 | Schlegl et al. | |
| 2007/0259182 A1 | 11/2007 | Bujard et al. | |
| 2008/0087187 A1 | 4/2008 | Maul et al. | |
| 2008/0249209 A1 | 10/2008 | Trummer et al. | |
| 2009/0117281 A1 | 5/2009 | Sato et al. | |
| 2010/0047199 A1 | 2/2010 | Trummer et al. | |
| 2010/0083875 A1 | 4/2010 | Nakao | |
| 2010/0196296 A1 | 8/2010 | Geissler et al. | |
| 2010/0251929 A1 | 10/2010 | Kagata et al. | |
| 2011/0008613 A1 | 1/2011 | Takano et al. | |
| 2011/0207833 A1 | 8/2011 | Albrecht et al. | |
| 2011/0293547 A1 | 12/2011 | Geissler et al. | |
| 2012/0208035 A1 | 8/2012 | Iwamoto et al. | |
| 2012/0295032 A1 | 11/2012 | Shimizu et al. | |
| 2013/0035400 A1 | 2/2013 | Nguyen et al. | |
| 2013/0102717 A1 | 4/2013 | Akutagawa et al. | |
| 2013/0131187 A1 | 5/2013 | Hashizume et al. | |
| 2013/0164529 A1 | 6/2013 | Yu et al. | |
| 2013/0209790 A1 | 8/2013 | Geissler et al. | |
| 2014/0050768 A1 | 2/2014 | Struck et al. | |
| 2014/0302241 A1* | 10/2014 | Lin .................... C08G 16/0268 | |
| | | | 427/393 |
| 2015/0013762 A1 | 1/2015 | Hegedus | |

(Continued)

FOREIGN PATENT DOCUMENTS

| | | |
|---|---|---|
| CN | 105980487 A | 9/2016 |
| CN | 106317969 A | 1/2017 |

(Continued)

OTHER PUBLICATIONS

Milne (2005) Gardeners Commercially Important Chemicals, Synonyms, Trade names and Properties, John Wiley & Sons. p. 271.
PVD Aluminum Pigments: Superior Brilliance for Coatings & Graphic Arts; Jun. 2000; Paint & Coatings Industry Magazine.
Eckhart PCU plus 800 product information Data sheet (2018).
Eckhart PCU standard 1000 product information data sheet (2015).
Evonik Resource Efficiency GmbH, Dynasylan DAMO product information data sheet (2017).
Evonik Resource Efficiency GmbH, Dynasylan GLYMO product information data sheet (2017).
Evonik Resource Efficiency GmbH, Dynasylan product range brochure (undated).

(Continued)

*Primary Examiner* — Robert T Butcher

(57) ABSTRACT

The invention provides a method for applying a new form of protective coating to substrates such as pigments, and also the coated substrates obtainable by this method. The coating are characterized by the fact that they impart good chemical resistivity to the substrate whilst also preserving its optical properties.

33 Claims, 7 Drawing Sheets

(56)            References Cited

U.S. PATENT DOCUMENTS

| | | |
|---|---|---|
| 2015/0071973 A1 | 3/2015 | Fujii et al. |
| 2015/0086771 A1 | 3/2015 | Sen et al. |
| 2015/0166760 A1 | 6/2015 | Trummer et al. |
| 2016/0150864 A1 | 6/2016 | Thomason et al. |
| 2016/0168388 A1 | 6/2016 | Barbe et al. |
| 2016/0244615 A1 | 8/2016 | Wuehr et al. |
| 2016/0304721 A1 | 10/2016 | Hippmann et al. |
| 2017/0306159 A1 | 10/2017 | Lang et al. |
| 2017/0348201 A1 | 12/2017 | Gruner et al. |
| 2018/0021240 A1 | 1/2018 | Stein-Hofmann et al. |
| 2018/0155550 A1 | 6/2018 | Grüner et al. |
| 2018/0344586 A1 | 12/2018 | Rohrer et al. |
| 2020/0131374 A1 | 4/2020 | Hayashi et al. |

FOREIGN PATENT DOCUMENTS

| | | |
|---|---|---|
| CN | 106700662 A | 5/2017 |
| CN | 107207877 A | 9/2017 |
| JP | 2003147226 | 5/2003 |
| JP | 2008127416 | 6/2008 |
| JP | 2012021040 | 2/2012 |
| JP | 2013185028 | 7/2013 |
| WO | WO 1996/38506 | 5/1996 |
| WO | 2009119143 | 1/2009 |
| WO | WO 2015/013762 | 2/2015 |

OTHER PUBLICATIONS

BASF Luwipal and Plastopal product data sheet (2017).
Silberline Sparkle Silver Elite 011 product data sheet (2017).
Schlenk Effect Pigments for Coatings Catalogue (undated).
Sigma-Aldrich Teraethyl orthosilicate Safety Data Sheet (2018).
Ekhart Stadart PCU data sheet (2018).
2016 flier describing STABILITAS product commercialized by Stockmeier.
P. Pihui et al., "Improved Performance of Aluminum Pigments Encapsulated in Hybrid Inorganic-Organic Films," Particuology, vol. 19, pp. 93-98, Apr. 1, 2015.

* cited by examiner

COATED PIGMENT AND METHOD OF MAKING

The present invention relates to a new form of protective coating that can be applied to substrates such as pigments. It also relates to a new method of treating pigments, including in particular pigments to which the new protective coating of the invention has been applied, so as to provide them with improved properties. In particular, the invention enables the production of stabilized fine pigments (e.g. aluminium pigments) with a superior combination of optical properties (e.g. gloss and/or lightness) and chemical resistance.

BACKGROUND TO THE INVENTION

Protective coatings are known in the art. For instance, metallic effect pigments such as those based on aluminium, bronze, iron oxide or steel can react with water, acids or bases in coating or ink formulations, and so the addition of a protective coating to such pigments may therefore be used to improve their chemical resistance. One drawback associated with applying such protective coatings to pigments, though, is that it may generally be expected to impact negatively on their optical properties. So there is often a trade-off between the potentially competing aims of optimising the chemical resistance and also maintaining good optical properties with pigments. For instance, among known commercially available coated aluminium (Al) pigments, those sold by Eckart under the "PCU" trade name have been described as being the best Al pigment product in the market in terms of chemical resistance. However, this useful attribute comes at the expense of the optical properties of the pigment. This is illustrated, for instance, in FIG. 2, which is an image of two polymer powder coating samples. One of them features PCU1000 pigment, and the other features pigment particles having the same particle size (namely 15 μm) but sold by Schlenk under the trade name POWDAL 8500 and having a different protective coating. As explained in more detail below, the POWDAL 8500 product can be seen to have better optical properties, but inferior chemical resistance.

Other coated pigments that have been discussed in the art include those described in CN106317969, CN106700662, WO9638506 and US20110195244 and include coatings prepared using poly addition reactions.

SUMMARY OF THE INVENTION

The present invention is based on the finding that a particular method of coating a pigment leads to a product with a surprisingly advantageous combination of both chemical resistance and optical properties. Thus, the present invention provides a method of coating a substrate, the method comprising (a) a step of subjecting an inorganic network former and an organofunctional network former to a condensation-type reaction, and subsequently (b) one or more further steps in which an inorganic network former and an organofunctional network former are subjected to a condensation-type reaction.

The present invention also provides a method of preparing a coated substrate, the method comprising one or more steps in which an inorganic network former and an organofunctional network former are subjected to a condensation-type reaction in the presence of a product, wherein said product is obtainable by subjecting an inorganic network former and an organofunctional network former to a condensation-type reaction in the presence of the substrate. This aspect of the invention focuses on just step (b) of the method of the invention as defined above. The preferred aspects of the invention as outlined herein apply correspondingly to this embodiment.

In this regard, coated substrates prepared by the above process have been found to enable a combination of high chemical resistivity and good optical properties that is believed to be unobtainable using previous coating methods. Also, the coating which results from the above process is believed to be more effective at reducing the likelihood of ignition during subsequent processing and handling as compared to coatings applied using previous coating methods. Also, the coating which results from the above process is believed to be more effective at improving gassing stability as compared to coatings applied using previous coating methods. However, the precise structural differences that result from using a method including the two steps (a) and (b) may not always be immediately susceptible to simple and immediate characterisation, and so the new products are most appropriately defined by reference to the particular combination of properties that they exhibit. Thus, the present invention also provides a coated substrate obtainable by the method of the invention as defined above. Also, the present invention provides a coated metal pigment or coated metal oxide pigment which (i) has a chemical resistivity score of no more than 12 in the "Test method for measuring chemical resistivity of coated pigments" set out further below, and (ii) has a gloss variance value (X) of ≤5.0, wherein:

X=Y/(13−the chemical resistivity score of the coated pigment),

Y is the percentage change in gloss resulting from the addition of the coating to the pigment, calculated as (100*(Y1−Y2)/Y1), Y1 is the gloss of the uncoated pigment, and Y2 is the gloss of the coated pigment, wherein gloss is measured by preparing a sample containing the coated or uncoated pigment according to steps (a) to (g) of the "Test method for measuring chemical resistivity of coated pigments" set out further below, and then using a glossmeter to measure the gloss at 60°.

Further, the present invention provides a coated metal pigment or coated metal oxide pigment which (i) has a chemical resistivity of less than 12 in the "Test method for measuring chemical resistivity of coated pigments" set out further below, and (ii) a lightness variance $L^A$ or $L^B$ value of ≥90, wherein:

$L^A$ is calculated as (100*(1+(Q2−Q1)/Q1)),

Q1 is the lightness at 15° of the uncoated pigment, and

Q2 is the lightness at 15° of the coated pigment;

$L^B$ is calculated as (100*(1+(Q4−Q3)/Q3)),

Q3 is the lightness at −15° of the uncoated pigment, and

Q4 is the lightness at −15° of the coated pigment;

wherein lightness at 15° and −15° is measured by preparing a sample containing the coated or uncoated pigment according to steps (a) to (g) of the "Test method for measuring chemical resistivity of coated pigments" set out further below, and then using a spectrophotometer.

Further, the present invention provides a coated metal pigment or coated metal oxide pigment which has a value of at least 40 mJ·m²/g for MIE*surface area (preferably at least 55 mJ·m²/g), wherein MIE is the minimum ignition energy and the surface area is the surface area as measured by the BET method.

Further, the present invention provides a coated metal pigment or coated metal oxide pigment which (i) has a gassing stability score of ≥700 seconds (preferably ≥1000 seconds) in the "Test method for measuring gassing stability of coated pigments" set out further below, and (ii) has a gloss variance value (X) of ≤5.0, wherein:

X=Y/(13–the chemical resistivity score of the coated pigment),

Y is the percentage change in gloss resulting from the addition of the coating to the pigment, calculated as (100*(Y1–Y2)/Y1), Y1 is the gloss of the uncoated pigment, and Y2 is the gloss of the coated pigment, wherein gloss is measured by preparing a sample containing the coated or uncoated pigment according to steps (a) to (g) of the "Test method for measuring chemical resistivity of coated pigments" set out further below, and then using a glossmeter to measure the gloss at 60°.

Further, the present invention provides a coated metal pigment or coated metal oxide pigment which (i) has a gassing stability of at least 700 seconds (preferably ≥1000 seconds) in the "Test method for measuring gassing stability of coated pigments" set out further below, and (ii) a lightness variance $L^A$ or $L^B$ value of ≥90, wherein:

$L^A$ is calculated as (100*(1+(Q2–Q1)/Q1)),

Q1 is the lightness at 15° of the uncoated pigment, and

Q2 is the lightness at 15° of the coated pigment;

$L^B$ is calculated as (100*(1+(Q4–Q3)/Q3)),

Q3 is the lightness at –15° of the uncoated pigment, and

Q4 is the lightness at –15° of the coated pigment;

wherein lightness at 15° and –15° is measured by preparing a sample containing the coated or uncoated pigment according to steps (a) to (g) of the "Test method for measuring chemical resistivity of coated pigments" set out further below, and then using a spectrophotometer.

PVD pigments tend to be particularly susceptible to chemical corrosion and it has been found that protective coatings applied to other pigment types may not work effectively on PVD pigments. However, the coating of the present invention is believed to provide PVD pigments with higher levels of chemical resistivity than has previously been possible. Thus, the present invention also provides a coated PVD metal pigment or coated PVD metal oxide pigment which has a chemical resistivity score of no more than 12 in the "Test method for measuring chemical resistivity of coated pigments" set out herein.

The present invention also provides a coated PVD metal pigment or coated PVD metal oxide pigment which has a gassing stability score of ≥700 seconds (preferably ≥1000 seconds) in the "Test method for measuring gassing stability of coated pigments" set out herein.

The present invention also provides a coated PVD metal pigment or coated PVD metal oxide pigment which has a gassing stability score after 21 days of ≤5 ml in the "extended gassing test method" set out herein.

The present invention also provides a method comprising applying one or more surface modifiers to a coated substrate of the invention as defined above, wherein the substrate is a pigment.

The present invention also provides a method comprising:

either (i) coating a substrate by a method as defined above, or (ii) preparing a coated substrate by a method as defined above, and subsequently applying one or more surface modifiers to the coated substrate, wherein the substrate is a pigment.

The present invention also provides a method of treating a pigment, the method comprising simultaneously, separately or sequentially applying one or more surface modifiers to the pigment, wherein said one or more surface modifiers include:

(a) both (i) an organophosphorous compound, and (ii) a compatibilizer as defined further below (wherein a major part of the compatibilizer does not become covalently bonded to the pigment);

(b) both (i) a fatty acid, and (ii) a compatibilizer as defined further below (wherein a major part of the compatibilizer does not become covalently bonded to the pigment); or (c) both (i) an organofunctional network former, and (ii) an organophosphorous compound.

Thus, by way of example, the present invention provides a method of treating a pigment, the method comprising simultaneously, separately or sequentially applying one or more surface modifiers to the pigment, wherein said one or more surface modifiers include an organophosphorous compound and a compatibilizer as defined further below, and wherein a major part of the compatibilizer does not become covalently bonded to the pigment.

The present invention also provides a pigment having on its surface (a) an organophosphorous compound and a compatibilizer as defined further below, wherein a major part of the compatibilizer is not covalently bonded to the pigment; (b) a fatty acid and a compatibilizer as defined further below, wherein a major part of the compatibilizer is not covalently bonded to the pigment; or (c) an organofunctional network former and an organophosphorous compound. (Thus, by way of example, the present invention provides a pigment having on its surface an organophosphorous compound and a compatibilizer as defined further below, wherein a major part of the compatibilizer is not covalently bonded to the pigment.)

The present invention also provides a product comprising a coated substrate of the invention as defined herein, which product is a varnish, automobile finish, paint, printing ink, powder coating material, architectural paint, plastic, security printing ink, ceramic, glass or cosmetic agent.

The present invention also provides a method of coating an article, which method comprises electrostatically applying a powder coating material to an article, and, optionally, curing the applied coating material, wherein the powder coating material comprising a coated substrate of the invention as defined herein.

The present invention also provides a coated article comprising a coated substrate of the invention as defined herein.

Figure 3:
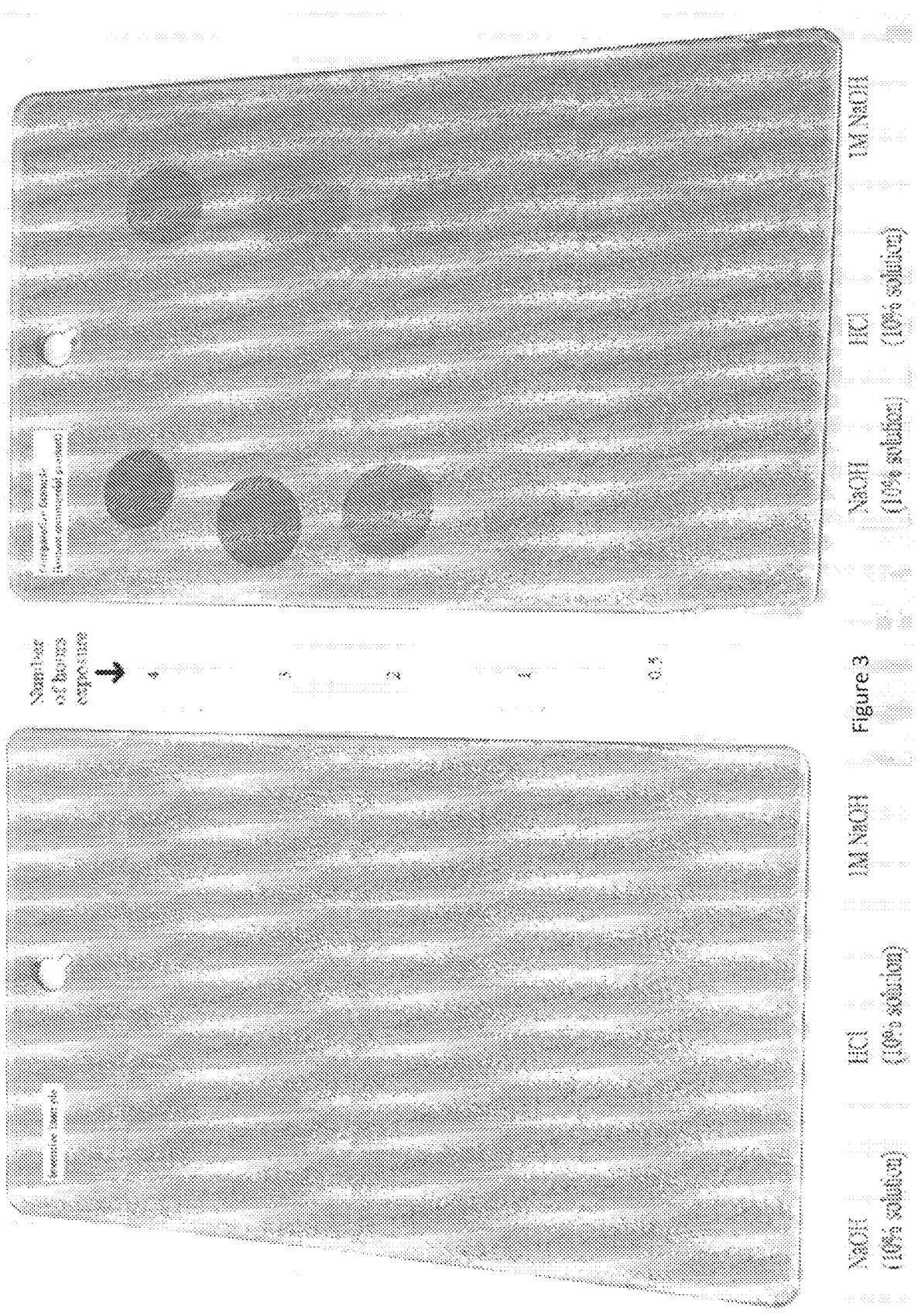
Figure 4:
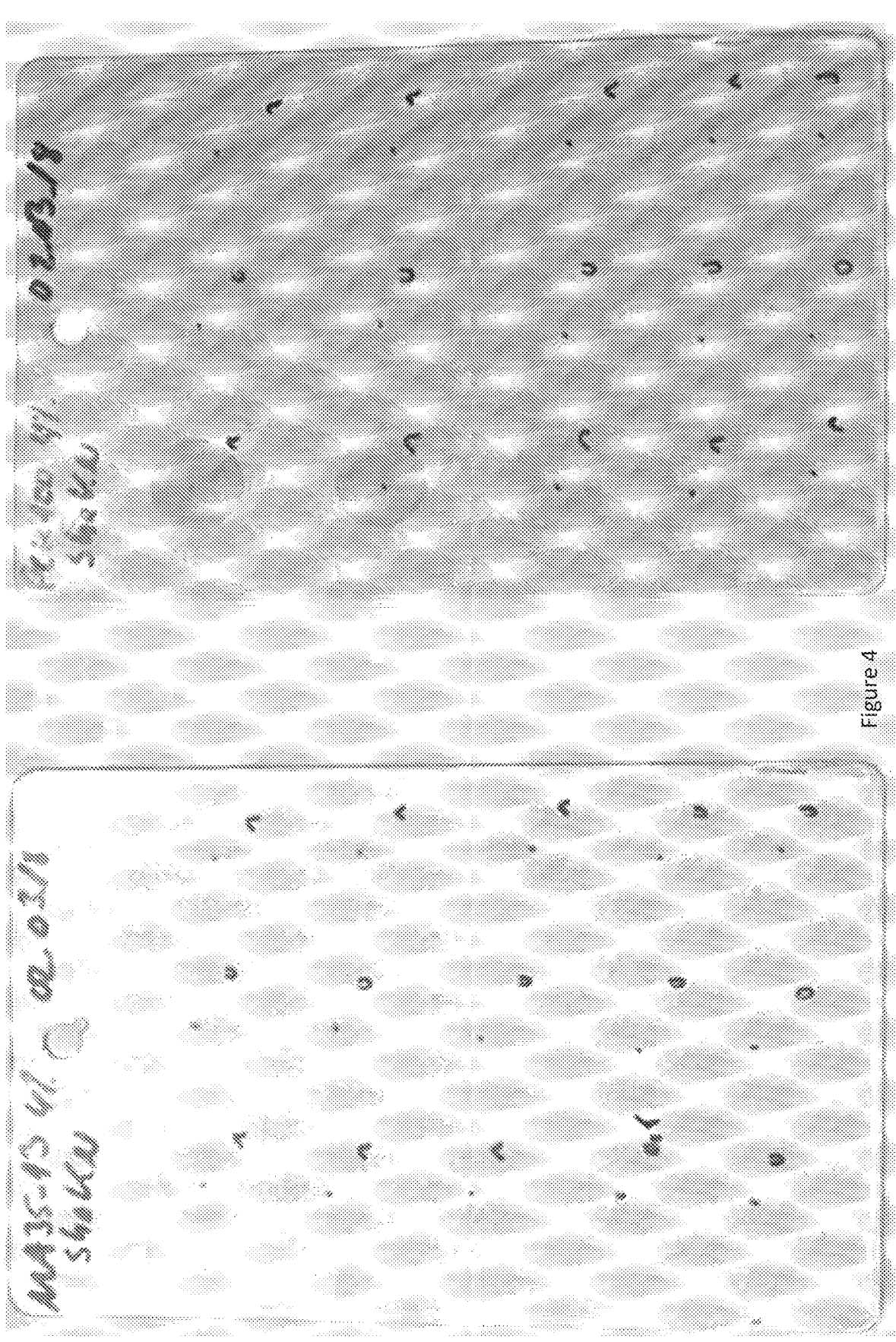
Figure 5:
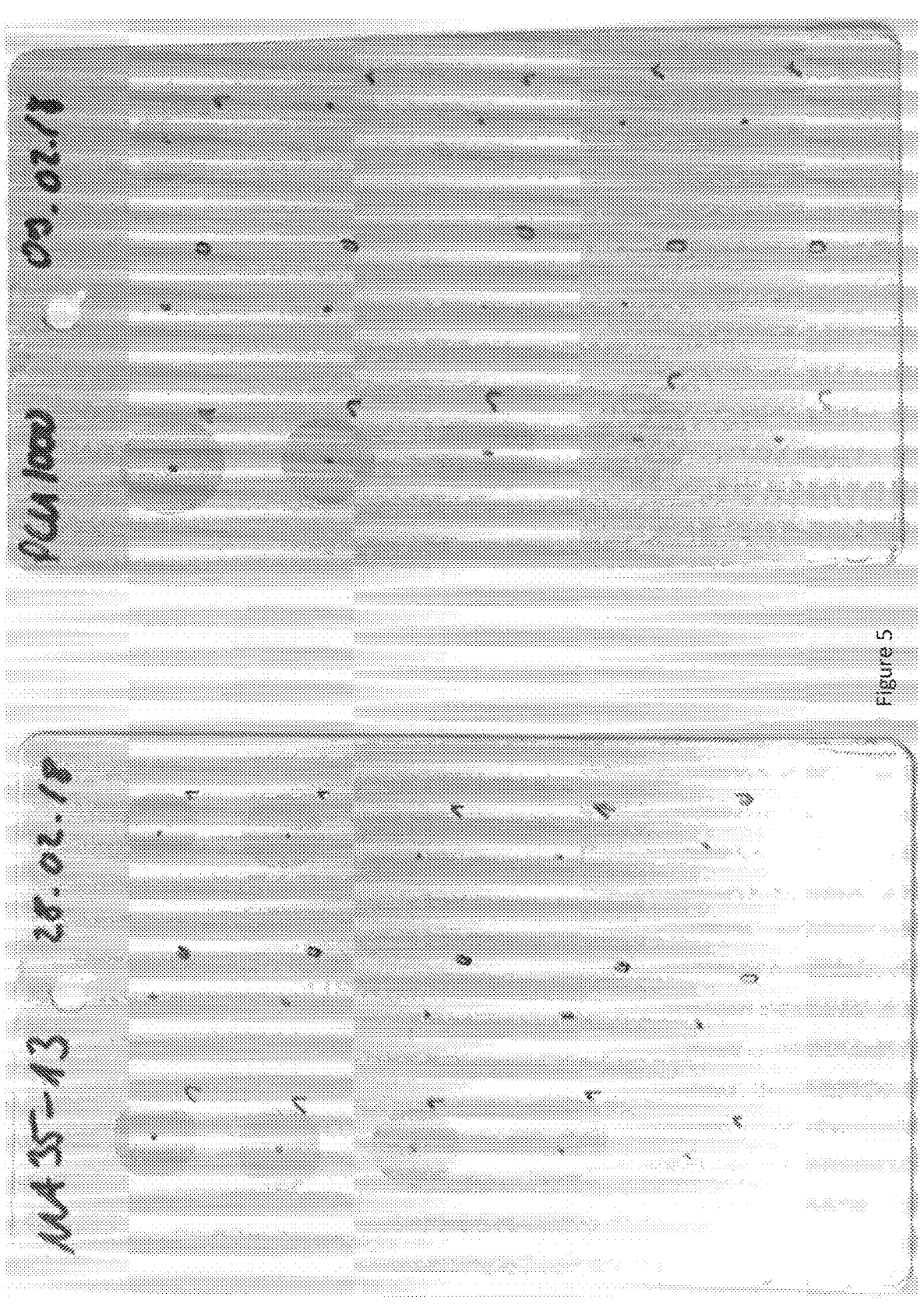

Each of FIGS. 3 to 5 shows images of two samples after chemical resistivity testing. In any given Figure the two samples differ only in terms of the pigment used to prepare them (with one being of the invention and the other a commercially available product). The formulation for each pair of samples (in each Figure) was different in terms of composition and/or how it was made. In other words, the invention was compared against the commercially available product in a range of different powder coating environments.

Figure 6:
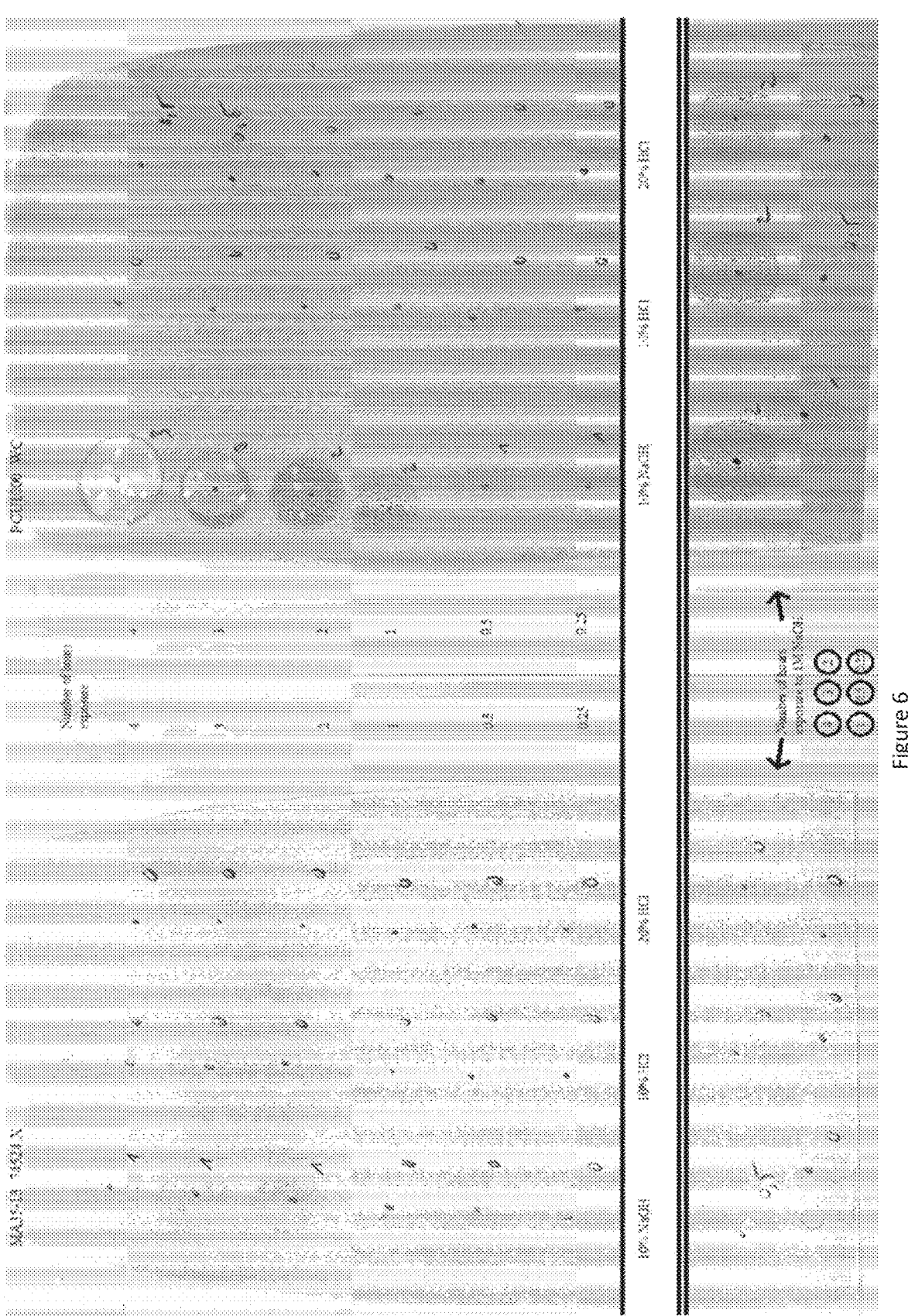

FIG. 6 shows images of drawdown samples made using a liquid coating, after chemical testing. The left hand sample was made with a coated pigment of the invention, and the right hand one with a commercially available pigment product.

Figure 7:
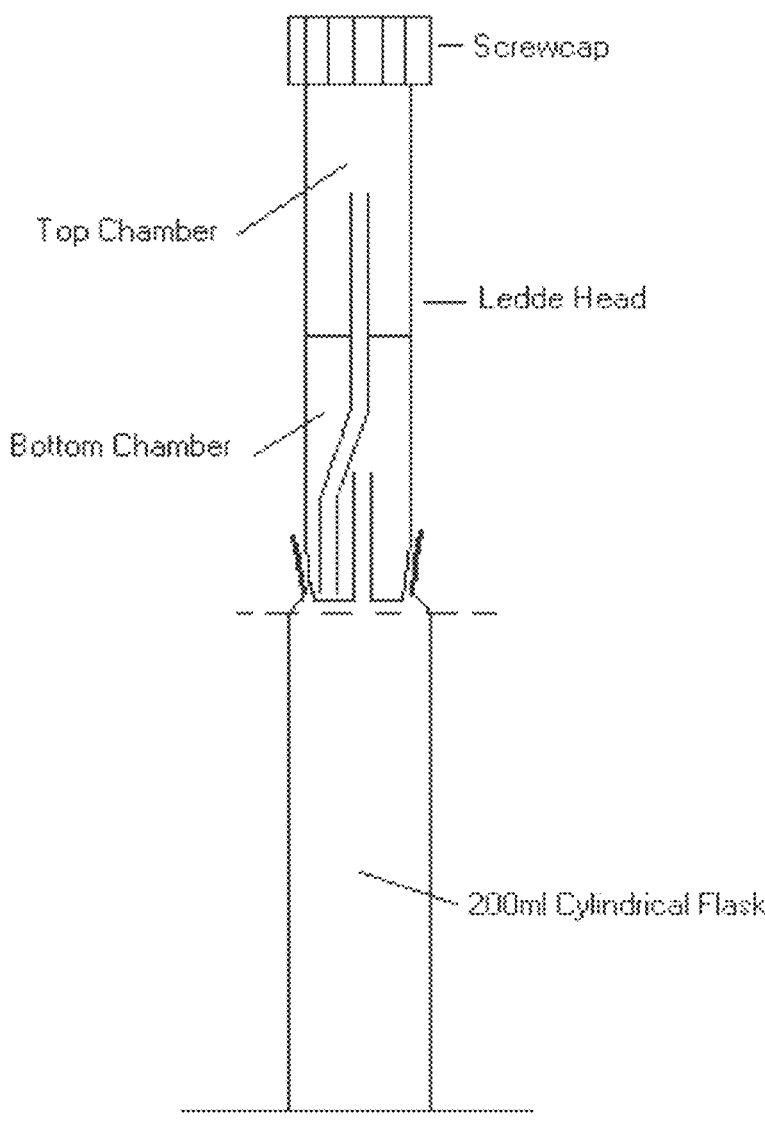

FIG. 7 shows a suitable gassing rig for use in the test procedure discussed below in connection with Examples 41D and 41E.

DETAILED DESCRIPTION

The Substrate

The substrate for use in the invention is not particularly limited. It may be a large-scale material such as a panel or girder, or may be a small-scale material such as a particulate product—e.g. flakes or platelets.

Preferably, the substrate is a flake or platelet product (e.g. a pigment) having a $d_{50}$ value of at least 1 µm, more preferably at least 2 µm, at least 3 µm, at least 4 µm, or at least 5 µm. The $d_{50}$ value is preferably no more than 2000 µm, such as no more than 1500 µm, no more than 1000 µm, no more than 500 µm, no more than 200 µm, no more than 150 µm, no more than 100 µm, no more than 80 µm, no more than 60 µm, no more than 50 µm, no more than 40 µm, no more than 35 µm, no more than 30 µm, or no more than 25 µm. Typical ranges of $d_{50}$ values are 2 to 2000 µm, preferably 3 to 1000 µm, more preferably 4 to 500 µm, even more preferably 5 to 100 µm, even further preferably 5 to 50 µm, and more preferably still 5 to 25 µm. The $d_{50}$ value is preferably measured by a laser diffraction method.

Preferably, the substrate is a flake or platelet product (e.g. a pigment) having an average aspect ratio of at least 5, more preferably at least 10, at least 25, at least 50, at least 75, at least 100, at least 110, at least 120, at least 130, at least 140, at least 150, at least 160, at least 170, at least 180, at least 190, or at least 200. The average aspect ratio is preferably no more than 2000, such as no more than 1500, no more than 1000, or no more than 750. Suitable ranges of average aspect ratios are 5 to 2000, preferably 50 to 2000, more preferably 100 to 2000, even more preferably 120 to 2000, even further preferably 150 to 2000 and more preferably still 200 to 2000. The average aspect ratio may be measured by taking the average (mean) aspect ratio of 30 (preferably 50, more preferably 100) individual flakes or platelets in the flake or platelet products as measured by microscopy, such as by scanning electron microscopy (SEM), transmission electron microscopy (TEM) or atomic force microscopy (AFM), wherein the aspect ratio for a given flake or platelet is defined as the longest diameter of the flake or platelet divided by the thickness. Preferably, the aspect ratios of the individual flake or platelet products are measured by scanning electron microscopy, e.g. using a Hitachi™ 4000PLUS apparatus.

Preferably, the substrate has an aspect ratio of at least 100 (such as at least 120) and a $d_{50}$ value of no more than 50 µm, no more than 40 µm, no more than 35 µm, no more than 30 µm, or no more than 25 µm.

Preferably, the substrate has a surface area as measured by the BET method of $\geq 1$ m²/g, such as $\geq 2$ m²/g or $\geq 3$ m²/g. In some embodiments it may be higher still, such as $\geq 4$ m²/g or $\geq 5$ m²/g.

Preferably, the substrate has $d_{50}$ value of no more than 35 µm (such as no more than 30 µm or no more than 25 µm) and an aspect ratio of at least 120, such as at least 150, or at least 200.

The substrate may comprise (or be substantially composed of) an inorganic material such as mica or glass, and/or it may comprise (or be substantially composed of) metal, either elemental or alloy. The substrate may comprise (or be substantially composed of) an inorganic material or metal having a coating of one or more metal oxide layers. Preferably, the substrate is a metal or metal oxide. More preferably, the substrate is a metal flake or metal platelet, wherein the metal is preferably aluminium, bronze, copper or zinc, and most preferably is aluminium. Examples of a suitable aluminium pigments are SPARKLE SILVER Elite 010, SPARKLE SILVER Elite 012, SPARKLE SILVER Elite 011 LM and SPARKLE SILVER Elite 015 LM, available from Silberline Manufacturing Co., US.

In a preferred embodiment the substrate is a metal pigment, more preferably an aluminium, bronze, copper or zinc pigment, most preferably an aluminium pigment. When the substrate is a metal (e.g. Al) pigment, the proportion of metal (e.g. Al) is preferably $\geq 90\%$, such as $\geq 95\%$, $\geq 98\%$, $\geq 99\%$, $\geq 99.5\%$ or $\geq 99.9\%$ by weight of the total weight of the uncoated metal (e.g. Al) pigment.

The substrates (e.g. metal flake pigments or metal platelet pigments) for use in the invention may be produced by known means. For instance, metal flake pigments or metal platelet pigments may be produced by a milling process, such as ball-milling. In another embodiment, metal flake pigments or metal platelet pigments may be produced by a vacuum metallisation process, such as by physical vapour deposition (PVD). In a further embodiment, metal flake pigments or metal platelet pigments may be produced by forming a metal oxide layer on the products of the above milling or vacuum metallisation processes.

The Inorganic Network Former

For the avoidance of doubt, while the claims and specification refer generally to the presence of "an" inorganic network former, it is of course possible for more than one different type of inorganic network former to be present in a given step of the method of the invention. Thus, references herein to "an inorganic network former" are intended to refer to situations where either one inorganic network former is present alone, or two or more inorganic network formers are present together.

The inorganic network former is preferably a compound of formula (I)

$$MX_n \tag{I}$$

wherein

M is Si, Al, Ti, Zr, B, Fe, Mg, Mn, Sb, Cr, Zn and/or Ce, each X is independently an optionally hydrolysable and/or condensable group selected from halogen, —OH, or —OR, and/or one, two or three pairs of X moieties together represent a divalent chelating ligand, wherein each R group is a $C_{1-10}$ alkyl group in which the carbon chain is optionally interrupted by one or more heteroatoms selected from N, O and S, and n is an integer from 2 to 6 and corresponds to the oxidation state of M.

Naturally not all possible values of n (from 2 to 6) will always be possible for all options for M. Persons of skilled in the art will be aware of which options for n are possible for a given option for M, taking into account the possible oxidation states of that option for M. For instance, if M is Sb (V), n may preferably be 5; if M is Si, Ti or Zr, n may preferably be 4; if M is Al, Ce, Fe(III), SB (III) or B, n may preferably be 3; and if M is Zn, Fe(II) or Mg, n may preferably be 2.

In a preferred embodiment, the inorganic network former is a compound of formula (I) wherein M is Si, Al, Ti, Zr or Fe; each X is $C_{1-6}$ alkoxy; and n is 2, 3 or 4. In a further preferred embodiment, M is Si; X is methoxy or ethoxy; and n is 4. Typically, the inorganic network former is tetraethoxysilane (TEOS).

The Organofunctional Network Former

For the avoidance of doubt, while the claims and specification generally refer to the presence of "an" organofunctional network former, it is of course possible for more than one different type of organofunctional network former to be present in a given step of the method of the invention. Thus, references herein to "an organofunctional network former" are intended to refer to situations where either one organofunctional network former is present alone, or two or more organofunctional network formers are present together.

The organofunctional network former is preferably a compound of formula (II)

$$R^1_iR^2_jR^3_kSiX_{(4-i-j-k)} \tag{II}$$

wherein each of i, j and k is independently 0 or 1, provided that at least one of i, j and k is 1, each of $R^1$, $R^2$ and $R^3$ is independently an organic group, provided that at least one of $R^1$, $R^2$ and $R^3$ is a reactive organic group, and each X is independently an optionally hydrolyzable and/or condensable group selected from halogen, —OH, —OR$^7$, or —Y, and/or one pair of X moieties together represent a divalent chelating ligand, wherein each $R^7$ is independently an organic group, preferably a $C_{1-10}$ alkyl group in which the carbon chain is optionally interrupted by one or more heteroatoms selected from N, O and S, and each Y is independently —(O—R$^4$—O—Si(R$^5$)$_m$ (X')$_{2-m}$—)$_n$, R$^6$, wherein each $R^4$ is independently a divalent organic group, each $R^5$ is independently an organic group, each m is independently 0, 1 or 2 each X' is independently an optionally hydrolyzable and/or condensable group selected from halogen, —OH, or —OR$^7$, and/or one or more pairs of geminal X' moieties together represent a divalent chelating ligand, wherein each $R^7$ is independently an organic group, n is 1 to 10, and $R^6$ is an organic group.

The reactive organic groups of the above compounds of formula (II) are preferably hydrocarbyl groups having one or more substituents selected from epoxy, amino, hydroxyl, thiol, acrylate, methacrylate, vinyl, allyl, alkenyl, alkynyl, carboxyl, carboxylic anhydride, isocyanate, cyanate, ureido and carbamate.

Preferably, the organofunctional network former is a compound selected from aminoalkyltrialkoxysilane, N-(alkyl)-aminoalkyltrialkoxysilane, N-aminoalkyl-aminoalkyl (alkyl)dialkoxysilane, N-aminoalkyl-aminoalkyltrialkoxysilane, epoxyalkyltrialkoxysilane, mercaptoalkyltrialkoxysilane, alkacryloxyalkyltrialkoxysilane (e.g. methacryloxyalkyltrialkoxysilane) and ureidoalkyltrialkoxysilane. Preferably the alkyl moieties are each independently selected from $C_{1-10}$ alkyl, more preferably $C_{1-6}$ alkyl, such as $C_{1-4}$ alkyl. Preferably the alkoxy moieties are $C_{1-10}$ alkoxy, more preferably $C_{1-6}$ alkoxy, such as $C_{1-4}$ alkoxy (typically they are ethoxy or methoxy, most commonly ethoxy).

For instance, suitable organofunctional network formers include the following: 3-aminopropyltrimethoxysilane, 3-aminopropyltriethoxysilane, N-(n-butyl)-3-amino-propyltrimethoxysilane, N-(n-butyl)-3-amino-propyltriethoxysilane, N-2-aminoethyl-3-aminopropyl(methyl)dimethoxysilane, N-2-aminoethyl-3-aminopropyl(methyl)diethoxysilane, N-2-aminoethyl-3-aminopropyltrimethoxysilane, N-2-aminoethyl-3-aminopropyltriethoxysilane, 3-glycidyloxypropyltriethoxysilane, 3-glycidyloxypropyltrimethoxysilane, 3-mercaptopropyltrimethoxysilane, 3-mercaptopropyltriethoxysilane, 3-methacryloxypropyltrimethoxysilane, 3-methacryloxypropyltriethoxysilane, 3-ureidopropyltrimethoxysilane, and 3-ureidopropyltriethoxysilane.

Suitable agents in this regard are commercially available. For instance, agents having epoxy groups are available from Evonik Resource Efficiency GmbH, Germany under the Dynasylan® trade name, such as Dynasylan® GLYEO and Dynasylan® GLYMO; and agents having amino groups are also available from Evonik Resource Efficiency GmbH, Germany under the Dynasylan® trade name, such as Dynasylan® AMEO (3-aminopropyltriethoxysilane) Dynasylan® AMMO (3-aminopropyltrimeihoxysilane), Dynasylan® DAMO (N-2-aminoethyl-3-aminopropyltrimethoxysilane) and Dynasylan® TRIAMO (Triamino-functional propyltrimethoxy-silane).

The Method

As was mentioned above, the present invention provides a method of coating a substrate, the method comprising:

(a) a step of subjecting an inorganic network former and an organofunctional network former to a condensation-type reaction, and subsequently:

(b) one or more (e.g. one or two) further steps in which an inorganic network former and an organofunctional network former are subjected to a condensation-type reaction.

Applying a hybrid coating in this manner, i.e. employing two or more separate steps in which an inorganic network former and an organofunctional network former are subjected to a condensation-type reaction, has been found to yield a coated substrate having surprisingly superior properties as compared to (e.g.) a corresponding coated substrate prepared by subjecting an equivalent overall amount of inorganic network former and organofunctional network former to a condensation-type reaction in a single step (the properties are of particular benefit when the substrate is a metal pigment, such as an aluminium pigment). It is believed that one reason for this may relate to the fact that introducing the reagents in two steps could facilitate the formation of chemical bonds between organofunctional moieties present on the substrate following step (a) and the organofunctional moieties of the organofunctional network former used in step (b). For instance if the organofunctional network former in step (a) features epoxy moieties, then the condensation-type reaction of step (a) may be expected to yield a substrate having terminal hydroxyl groups. If the organofunctional network former in step (b) features epoxy moieties, then those moieties may react with the terminal hydroxyl groups present following step (a). Thus, in a preferred aspect, the organofunctional network former in step (b) includes an organofunctional moiety capable of reacting with (and which does react with) an organofunctional moiety present on the substrate surface following step (a) (and derived from the organofunctional network former used in step (a)), to form a chemical bond, such as a covalent bond. Having said that, it is also believed that this possible explanation (relating to the potential facilitation of chemical bond formation between organofunctional moieties) is just one of a number of reasons why the method of the present invention provides superior coatings, and accordingly, it may not be essential for the organofunctional network former in step (b) to be capable of reacting with one or more organofunctional moieties present on the substrate surface following step (a), to form a chemical bond, in order to enjoy some of the advantages of the invention; it is preferred, though.

For instance, preferred embodiments include ones where the organofunctional network former in step (a) comprises one or more epoxy, amino, mercapto, and/or ureido moieties, and the organofunctional network former in step (b) comprises one or more epoxy or alkacryl (e.g. methacryl) moieties; or the organofunctional network former in step (a) comprises one or more alkacryl (e.g. methacryl) moieties, and the organofunctional network former in step (b) comprises one or more amino, mercapto, and/or ureido moieties (preferably one or more amino moieties).

Further preferred embodiments include ones where the organofunctional network former in step (a) includes one or more epoxy or amino moieties; and the organofunctional network former in step (b) includes one or more epoxy or alkacryl (e.g. methacryl) moieties (preferably one or more epoxy moieties).

In one preferred embodiment of the method of the invention:

the inorganic network former in each of steps (a) and (b) is a tetraalkoxysilane, the organofunctional network former in step (a) is an epoxysilane or an aminosilane, and the organofunctional network former in step (b) is an epoxysilane.

It will be appreciated from the definition of the method of the invention as set out above, and in particular the fact that it is a method of coating the substrate, that step (a) is to be carried out in the presence of the substrate (to be coated), and similarly that step (b) is to be carried out in the presence of the substrate which has already been coated during step (a). Thus the present method (of the invention) of coating a substrate comprises (a) a step of coating the substrate by subjecting an inorganic network former and an organofunctional network former to a condensation-type reaction in the presence of the substrate, and subsequently (b) one or more further steps in which the substrate is further coated by subjecting an inorganic network former and an organofunctional network former to a condensation-type reaction in the presence of the substrate that was coated in step (a).

As indicated above, the method of the present invention may include more than two of the condensation-type reactions, e.g. three of more such reactions. For instance, in one embodiment the method of the present invention comprises (a) a step of subjecting an inorganic network former and an organofunctional network former to a condensation-type reaction, and subsequently:

(b) a first further step of subjecting an inorganic network former and an organofunctional network former to a condensation-type reaction, and then subsequently a second (and optionally more) further steps in which an inorganic network former and an organofunctional network former are subjected to a condensation-type reaction.

Carrying out three or more such condensation-type reaction steps may afford the coated pigment further enhanced properties. In this regard, though, as indicated above, it is not merely a case of carrying out an extra reaction to make a thicker (and thus more protective) overall layer. Rather, the advantages of the method of the invention arise over corresponding products wherein the same amount of overall coating is applied in less steps, such as in a single step.

It is preferred that the condensation-type reaction in step (a) proceeds to a substantial degree of completeness (e.g. ≥30% completeness, ≥40% completeness, ≥50% completeness, ≥60% completeness, ≥70% completeness, ≥80% completeness, or ≥90% completeness) prior to the subsequent condensation-type reaction in step (b). In the case that step (b) comprises more than one step in which an inorganic network former and an organofunctional network former are subjected to a condensation-type reaction, it is further preferred that each condensation-type reaction proceed to a substantial degree of completeness (i.e. ≥30% completeness, ≥40% completeness, ≥50% completeness, ≥60% completeness, ≥70% completeness, ≥80% completeness, or ≥90% completeness) prior to any subsequent condensation-type reaction.

Preferably, the condensation-type reaction in step (a) proceeds for ≥5 minutes, such as ≥10 minutes, ≥15 minutes, ≥20 minutes, ≥30 minutes, ≥45 minutes, ≥60 minutes, ≥75 minutes, ≥90 minutes, or ≥120 minutes prior to step (b). In the case that step (b) comprises more than one step in which an inorganic network former and an organofunctional network former are subjected to a condensation-type reaction, it is further preferred that each condensation-type reaction proceed to a substantial degree of completeness (e.g. proceeding for ≥5 minutes, such as ≥10 minutes, ≥15 minutes, ≥20 minutes, ≥30 minutes, ≥45 minutes, ≥60 minutes, ≥75 minutes, ≥90 minutes, or ≥120 minutes) prior to any subsequent condensation-type reaction. In both steps there is not particular upper limit for the length of the reaction, though generally it is unnecessary to continue the reaction any longer than, say, 10 hours as no extra benefit would be expected (typically the reaction may be stopped after ≤5 hours, such as ≤4 hours or ≤3 hours).

In a preferred embodiment, the condensation-type reaction(s) in step (a) and/or (b) (preferably all such reactions) in the method of the present invention is (are) carried out in the presence of a catalyst. The catalyst may be an acid or a base. Preferably, the catalyst is a Brøsted-basic or Lewis-basic catalyst, preferably a nitrogen-based Brøsted-basic or nitrogen-based Lewis-basic catalyst. Suitable nitrogen-based Brønsted-basic or nitrogen-based Lewis-basic catalysts may be ammonia, amines (including polyamines), aminoalcohols or nitrogen-containing aromatic or heteroaromatic compounds. Particularly preferred nitrogen-based Brøsted-basic or nitrogen-based Lewis-basic catalysts include ethylenediamine (EDA), monoethanolamine (MEA) and N-methylimidazole (NMI). Such agents may be used directly or in admixture with a solvent.

In a preferred embodiment, the condensation-type reaction(s) in step (a) and/or (b) (preferably all such reactions) in the method of the present invention is (are) carried out in a solvent. Preferably, the solvent is a protic solvent, more preferably an alcohol such as a $C_{1-6}$ alkanol or a $C_{1-6}$ alkoxy-$C_{1-6}$alkanol. Suitable solvents include isopropanol (IPA) and 1-methoxy-2-propanol.

In a preferred embodiment, the condensation-type reaction(s) in step (a) and/or (b) (preferably all such reactions) in the method of the present invention is (are) carried out at elevated temperature. The appropriate temperature will depend on the specific reagents present, an in particular any solvent that may be employed. Preferred temperatures are ones of ≥50° C., such as ≥60° C., ≥70° C., or ≥80° C. The temperature is preferably ≤200° C., such as ≤170° C., ≤150° C., or ≤130° C.

In step (a) and/or (b) (preferably both) in the method of the present invention, the molar ratio of inorganic network former to organofunctional network former may be defined as X:1. Preferably X is ≥0.5, such as ≥1, ≥2, ≥3, ≥4, ≥5, ≥6, ≥7, or ≥8. Preferably X is ≤200, such as ≤160, ≤140, ≤120, ≤110, or ≤100. A typical range is 1 to 120, or 5 to 120.

The absolute amounts of inorganic network former and organofunctional network former to be employed will depend on the available surface area of the substrate which is to be coated. For pigment substrates, surface area will naturally depend on particle size. These agents may be used in an amount to provide a coated substrate wherein the coating has a thickness of Y. Preferably Y is ≥2 nm, such as ≥3 nm, ≥4 nm, ≥5 nm, ≥6 nm, ≥7 nm, or ≥8 nm. Preferably Y is ≤300 nm, such as ≤250, ≤200, ≤150, ≤120, ≤100, ≤90, ≤90, ≤80, ≤70, ≤60, or ≤50 nm. A typical range is 5-70 nm.

The coatings obtainable by the method of the present invention may have relatively high silicon contents. In a preferred aspect, the silicon content of the coating may be ≥12%, such as ≥13%, ≥14%, or ≥15% as measurable by EDS.

Considering the total amount of inorganic network former and organofunctional network former to be used in the method of the invention, there is scope for variation in terms of the proportion of each one used in step (a) vs step (b) (particularly when step (b) includes multiple, separate condensation-type reactions). However, for both the inorganic network former and also the organofunctional network former, if the ratio of the amount used in one condensation-type reaction in the method to the amount used in any other condensation-type reaction in the same method is defined as Z:1, then preferably Z is within the range 0.1 to 10, such as 0.2 to 5.

In each of steps (a) and (b) in the method of the invention, the condensation-type reaction leads to the formation, preferably via a sol-gel process, of a network which is (primarily) inorganic in nature but also includes organic moieties derived from the organofunctional network former. For instance, in the preferred situation where the inorganic network former is a tetraalkoxysilane, the reaction may lead to the formation of a network based on Si and O but also including organic moieties derived from the organofunctional network former.

In a preferred aspect of the method of the invention, in step (a) the condensation-type reaction takes place in the presence of a dispersing agent. The dispersing agent is preferably an agent composed of inert particles, such as metal oxide particles—e.g. amorphous metal oxide particles such as AEROXIDE Alu C, AEROXIDE Alu 130, AEROSIL 200 or ACEMATT OK 412 available from Evonik. Preferably the dispersing agent is in the form of nanoparticles. Suitable agents include fumed silica and colloidal silica. The presence of a dispersing agent can facilitate processing and can also serve to increase the chemical resistance of the coated substrate.

In a particularly preferred aspect, the method (of the invention) of coating a substrate comprises
(a) a step of subjecting an inorganic network former and an organofunctional network former to a condensation-type reaction in the presence of a solvent and a catalyst, wherein the reaction preferably proceeds for ≥5 minutes,
and subsequently
(b) one or more further steps in which an inorganic network former and an organofunctional network former are subjected to a condensation-type reaction in the presence of a solvent and a catalyst;

wherein:
the substrate is an aluminium pigment;
each inorganic network former is independently a tetraalkoxysilane;
each organofunctional network former is independently a compound selected from an aminoalkyltrialkoxysilane, N-(alkyl)-aminoalkyltrialkoxysilane, N-aminoalkyl-aminoalkyl(alkyl)dialkoxysilane, N-aminoalkyl-aminoalkyltrialkoxysilane, epoxyalkyltrialkoxysilane, mercaptoalkyltrialkoxysilane, alkacryloxyalkyltrialkoxysilane (e.g. methacryloxyalkyltrialkoxysilane) and ureidoalkyltrialkoxysilane, wherein the alkyl moieties are each independently selected from $C_{1-10}$ alkyl and the alkoxy moieties are each independently selected from $C_{1-10}$ alkoxy (and preferably the organofunctional network former in step (b) includes an organofunctional moiety which reacts with an organofunctional moiety present on the substrate surface following step (a) and derived from the organofunctional network former used in step (a), to form a chemical bond); and
in each of steps (a) and (b) the molar ratio of inorganic network former to organofunctional network former is X:1 wherein X is 1 to 120.

The Coated Substrate

As noted above, the present invention provides a coated substrate obtainable by a method of the invention as defined herein (for the avoidance of doubt, this includes coated substrates to which one or more surface modifiers have been applied, as described further below). Preferred features of the invention as set out in the preceding and following sections apply similarly to the coated substrate of the invention. For example, the coating in the coated substrate of the invention may have a thickness Y, wherein preferably Y is ≥2 nm, such as ≥3 nm, ≥4 nm, ≥5 nm, ≥6 nm, ≥7 nm, or ≥8 nm, and preferably Y is ≤300 nm, such as ≤250, ≤200, ≤150, ≤120, ≤100, ≤90, ≤90, ≤80, ≤70, ≤60, or ≤50 nm. A typical range is 5-70 nm.

The coated substrate is preferably a coated aluminium pigment. In this regard, as indicated above, the method of the invention enables the preparation of aluminium pigments having a combination of high chemical resistivity and good optical properties that is believed to be unobtainable using previous coating methods, and also it is believed to enable the application of coatings which are more effective at reducing the likelihood of ignition during subsequent processing and handling as compared to coatings applied using previous coating methods, and also it is believed to enable the application of coatings which are more effective at improving gassing stability as compared to coatings applied using previous coating methods, plus PVD aluminium pigments having a chemical resistivity that is believed to be unobtainable using previous coating methods. To this end, the products provided by the present invention include the following:
a coated metal pigment or coated metal oxide pigment which (i) has a chemical resistivity score of no more than 12 in the "Test method for measuring chemical resistivity of coated pigments" as defined further below, and (ii) has a gloss variance value (X) as defined above of ≤5.0 (products of this type are referred to below as the first pigment);
a coated metal pigment or coated metal oxide pigment which (i) has a chemical resistivity of less than 12 in the "Test method for measuring chemical resistivity of coated pigments" as defined further below, and (ii) a lightness variance $L^A$ or $L^B$ value as defined above of $\geq 90$ (products of this type are referred to below as the second pigment);

a coated metal pigment or coated metal oxide pigment which has a value of at least 40 mJ·m$^2$/g for MIE*surface area (preferably at least 55 mJ·m$^2$/g), wherein MIE is the minimum ignition energy and the surface area is the surface area as measured by the BET method (products of this type are referred to below as the third pigment); a coated metal pigment or coated metal oxide pigment which (i) has a gassing stability score of $\geq 700$ seconds (preferably $\geq 1000$ seconds) in the "Test method for measuring gassing stability of coated pigments" set out further below, and (ii) has a gloss variance value (X) as defined above of $\leq 5.0$ (products of this type are referred to below as the fourth pigment);

a coated metal pigment or coated metal oxide pigment which (i) has a gassing stability score of $\geq 700$ seconds (preferably $\geq 1000$ seconds) in the "Test method for measuring gassing stability of coated pigments" set out further below, and (ii) has a lightness variance $L^A$ or $L^B$ value as defined above of $\geq 90$ (products of this type are referred to below as the fifth pigment);

a coated PVD metal pigment or coated PVD metal oxide pigment which has a chemical resistivity score of no more than 12 in the "Test method for measuring chemical resistivity of coated pigments" as defined further below (products of this type are referred to below as the sixth pigment);

a coated PVD metal pigment or coated PVD metal oxide pigment which has a gassing stability score of $\geq 700$ seconds (preferably $\geq 1000$ seconds) in the "Test method for measuring gassing stability of coated pigments" as defined further below (products of this type are referred to below as the seventh pigment); and a coated PVD metal pigment or coated PVD metal oxide pigment which has a gassing stability score after 21 days of $\leq 5$ ml in the extended gassing test method defined further below in Example 41 (products of this type are referred to below as the eighth pigment).

Preferred aspects for the pigment in each of these embodiments are, independently, the same as those set out above in connection with the substrate for use in the method of the invention (when the substrate is a pigment). Thus, preferred options for the metal and metal oxide are the same as those noted above for the substrate for use in the method of the invention. Aluminium and copper oxide are particularly preferred, with aluminium being most preferred. Further preferred aspects for each of these embodiments are set out below.

For each of the first and sixth pigments, it is (independently) preferred that the pigment has a chemical resistivity score in the above-mentioned test of no more than 11.5, such as no more than 11.

For the second pigment, it is preferred that the chemical resistivity score in the above-mentioned test is no more than 11.

For each of the third, fourth, fifth seventh and eighth pigments, it is (independently) preferred that the pigment has a chemical resistivity score of no more than 12 in the "Test method for measuring chemical resistivity of coated pigments" as defined further below, more preferably no more than 11.5, such as no more than 11.

In some particularly preferred aspects for each of the first, second, third, fourth, fifth, sixth, seventh and eighth pigments, the chemical resistivity score may (independently) be lower still, such as no more than 10.5, no more than 10, no more than 9.5, no more than 9, no more than 8.5, or no more than 8.

For each of the second, third, fifth, sixth, seventh and eighth pigments, it is (independently) preferred that the pigment has a gloss variance value (X) as defined above (in connection with the first pigment) of $\leq 5.0$.

For each of the first, second, third, fourth, fifth, sixth, seventh and eighth pigments it is (independently) preferred that the gloss variance value (X) is $\leq 4.5$, such as $\leq 4.0$ or $\leq 3.5$. There is no particular lower limit on the gloss variance value (X), although typically the gloss variance is a positive number since the gloss of a pigment usually decreases when a coating is applied to it. Typical ranges for the gloss variance value are 0.1 to 5.0, such as 0.2 to 4.5, 0.3 to 4.0, 0.4 to 3.5 or 0.5 to 3.5.

For each of the first, third, fourth, sixth, seventh and eighth pigments it is (independently) preferred that the lightness variance $L^A$ value as defined above (in connection with the second pigment) is $\geq 90\%$.

For each of the first, second, third, fourth, fifth, sixth, seventh and eighth pigments it is (independently) particularly preferred that $L^A$ is $\geq 92\%$, for instance $\geq 94\%$, $\geq 96\%$, $\geq 98\%$, $\geq 100\%$, $\geq 102\%$, $\geq 104\%$ or $\geq 105\%$.

For each of the first, third, fourth, sixth, seventh and eighth pigments it is (independently) preferred that the lightness variance $L^B$ value as defined above is $\geq 90\%$.

For each of the first, second, third, fourth, fifth, sixth, seventh and eighth pigments, it is (independently) particularly preferred that $L^B$ is $\geq 92\%$, for instance $\geq 94\%$, $\geq 96\%$, $\geq 98\%$, $\geq 100\%$, $\geq 102\%$, $\geq 104\%$ or $\geq 105\%$.

Thus, for each of the first, second, third, fourth, fifth, sixth, seventh and eighth pigments it is (independently) preferred that at least one (and typically both) of $L^A$ and $L^B$ is $\geq 90\%$, such as $\geq 92\%$, $\geq 94\%$, $\geq 96\%$, $\geq 98\%$, $\geq 100\%$, $\geq 102\%$, $\geq 104\%$ or $\geq 105\%$. Preferably, neither of $L^A$ and $L^B$ is $\geq 150\%$, more preferably neither of $L^A$ and $L^B$ is $\geq 140\%$, and more preferably still neither of $L^A$ and $L^B$ is $\geq 130\%$. Typical ranges for $L^A$ are 90 to 140%, such as 92 to 135%, 94 to 130%, or 96 to 125%. Typical ranges for $L^B$ are 90 to 140%, such as 92 to 135%, 94 to 130%, or 96 to 125%. Preferably, $L^A$ and $L^B$ are both in the range of 90 to 140%, or 92 to 135%, or 94 to 130%, or 96 to 125%.

For each of the first, second, fourth, fifth, sixth, seventh and eighth pigments it is (independently) preferred that the pigment which has a value of at least 40 mJ·m$^2$/g for MIE*surface area (preferably at least 55 mJ·m$^2$/g), wherein MIE is the minimum ignition energy and the surface area is the surface area as measured by the BET method.

For each of the first, second, third, fourth, fifth, sixth, seventh and eighth pigments it is (independently) preferred that the pigment has a value of at least 50, such as at least 60, at least 70, at least 80, at least 90, or at least 100 mJ·m$^2$/g for MIE*surface area. In some aspects the pigment may have a value for MIE*surface area which is higher still, such at least 110, or at least 120 mJ·m$^2$/g. Generally it is preferred for the pigment to have a value of at least 55 mJ·m$^2$/g for MIE*surface area.

For each of the first, second, third, sixth and eighth pigments it is (independently) preferred that the pigment has a gassing stability score of $\geq 700$ seconds (preferably $\geq 1000$ seconds) in the "Test method for measuring gassing stability of coated pigments" set out further below.

For each of the first, second, third, fourth, fifth, sixth, seventh and eighth pigments it is (independently) preferred that the pigment has a gassing stability score of $\geq 800$ seconds in the "Test method for measuring gassing stability of coated pigments" set out further below, more preferably ≥900, and more preferably still ≥1000 seconds. In some embodiments it may be higher still, such as ≥1100, ≥1200, ≥1300, or ≥1400 seconds.

In a particular embodiment, the present invention provides a coated metal pigment or coated metal oxide pigment which has a value of ≥40 mJ·m$^2$/g (preferably ≥50, such as ≥60, ≥70, ≥80, ≥90, ≥100, ≥110, or ≥120 mJ·m$^2$/g) for MIE*surface area, wherein MIE is the minimum ignition energy and the surface area is the surface area as measured by the BET method, and the pigment has a gloss variance value (X) as defined above of ≤5.0 (preferably ≤4.5, such as ≤4.0 or ≤3.5). It is generally preferred in this regard for the pigment to have a value at least 55 mJ·m$^2$/g for MIE*surface area.

In another embodiment, the present invention provides a coated metal pigment or coated metal oxide pigment which has a value of ≥40 mJ·m$^2$/g (preferably ≥50, such as ≥60, ≥70, ≥80, ≥90, ≥100, ≥110, or ≥120 mJ·m$^2$/g) for MIE*surface area, wherein MIE is the minimum ignition energy and the surface area is the surface area as measured by the BET method, and the pigment has a lightness variance $L^A$ or $L^B$ value as defined above of ≥90 (the further preferred options for $L^A$ and $L^B$ as set out above also apply to this embodiment). It is generally preferred in this regard for the pigment to have a value at least 55 mJ·m$^2$/g for MIE*surface area.

For all of the coated metal pigments and coated metal oxide pigments of the invention as described above, the MIE is preferably ≥5 mJ, such as ≥6 mJ, ≥7 mJ, ≥8 mJ, ≥9 mJ, or ≥10 mJ.

For all of the coated metal pigments and coated metal oxide pigments of the invention as described above, the surface area is preferably ≥1 m$^2$/g, such as ≥2 m$^2$/g or ≥3 m$^2$/g. In some embodiments it may be higher still, such as ≥4 m$^2$/g or ≥5 m$^2$/g.

For all of the coated metal pigments and coated metal oxide pigments of the invention as described above, it is preferred that the pigments have a gassing stability score after 21 days of ≤5 ml, more preferably ≤4 ml, more preferably still ≤3 ml, yet more preferably ≤2 ml, and most preferably ≤1 ml after 21 days in the "extended gassing test method" described below in Example 41. Typically it is 0 ml. This is particularly the case for PVD pigments.

Surface Modification of Coated Substrates

The present invention provides a method which comprises applying one or more surface modifiers to a coated substrate of the invention as defined above. It also provides a method which comprises coating a substrate by a method of the invention as defined above, and subsequently applying one or more surface modifiers to the coated substrate.

Preferably, said one or more surface modifiers include:
(a) both (i) an organophosphorous compound, and (ii) a compatibilizer having a molecular weight of 5,000 or less, and wherein the organophosphorous compound and compatibilizer are applied simultaneously, separately or sequentially;
(b) both (i) a fatty acid, and (ii) a compatibilizer having a molecular weight of 5,000 or less, and wherein the fatty acid and compatibilizer are applied simultaneously, separately or sequentially;
(c) both (i) an organofunctional network former, and (ii) an organophosphorous compound and wherein the organofunctional network former and organophosphorous compound are applied simultaneously, separately or sequentially.

In one preferred aspect, said one or more surface modifiers include both (i) an organophosphorous compound, and (ii) a compatibilizer having a molecular weight of 5,000 or less, and wherein the organophosphorous compound and compatibilizer are applied simultaneously, separately or sequentially.

In another preferred aspect, said one or more surface modifiers include both (i) a fatty acid, and (ii) a compatibilizer having a molecular weight of 5,000 or less, and wherein the organophosphorous compound and compatibilizer are applied simultaneously, separately or sequentially.

In another preferred aspect, said one or more surface modifiers include both (i) an organofunctional network former, and (ii) an organophosphorous compound, and wherein the organofunctional network former and organophosphorous compound are applied simultaneously, separately or sequentially.

The organophosphorus compound is preferably a compound of formula (III):

$$I-X-P(O)(OR^1)(OR^2) \tag{III}$$

wherein
$R^1$ and $R^2$ are each independently H, optionally substituted hydrocarbyl, optionally substituted amine, polyether, an ammonium ion, an alkali metal, or an alkaline earth metal (preferably $R^1$ and $R^2$ are H);
X is divalent and is (a) a straight or branched hydrocarbon chain, said hydrocarbon chain being optionally interrupted by one or more heteroatoms selected from O, S and N, (b) an optionally substituted carbocyclic ring, wherein said ring is selected from cycloalkyl, cycloalkenyl, aryl and a fused carbocyclic group, or (c) an optionally substituted heterocyclic ring including one or more heteroatoms selected from O, S and N (preferably X is $C_{4-14}$ alkylene); and
I is H or an initiator moiety for polymerization (preferably I is H).

The compatibilizer preferably has a molecular weight of ≤5,000, such as ≤4,000, ≤3,000, ≤2,000, or ≤1,500. The compatibilizer preferably has a molecular weight of ≥200, such as ≥300, ≥400, or ≥500.

The compatibilizer is preferably an organic compound, more preferably a resin. More preferably still, the compatibilizer is a melamine resin, an isocyanate resin, a polyurethane resin or an acrylic resin, most preferably a $C_{1-4}$ alcohol-etherified melamine-formaldehyde resin (preferred options for the alcohol in this embodiment are methanol, ethanol and propanol) or an isophorone diisocyanate trimer resin. An example of a suitable commercially available compatibilizer is Luwipal® 072 available from BASF, Germany).

The fatty acid is preferably a compound of formula R—C(O)OH wherein R is an aliphatic saturated or unsaturated hydrocarbon group. Thus, R may be an alkyl, alkenyl or alkynyl group. Preferably R is an alkyl or alkenyl group.

R may be linear or branched, though typically it is linear.

Preferably R has 3 to 29 carbons, i.e. the fatty acid is a $C_{4-30}$ fatty acid. More preferably R has 3 to 27 carbon atoms, e.g. it may be a linear $C_{3-27}$ alkyl group or a linear $C_{3-27}$ alkenyl group. R is often a linear, saturated or unsaturated, aliphatic hydrocarbon group having from 10 to 24 carbon atoms, e.g. a linear $C_{11-25}$ alkyl group or a linear $C_{11-25}$ alkenyl group. Unsaturated aliphatic hydrocarbon groups may contain multiple double bonds, such as 1 to 4 double bonds, for instance 1 or 2 double bonds, and typically 1 double bond.

Examples of saturated fatty acids include butyric acid (C4), valeric acid (C5), caproic acid (C6), enanthic acid (C7), caprylic acid (C8), pelargonic acid (C9), capric acid (C10), undecylic acid (C11), lauric acid (C12), tridecylic acid (C13), myristic acid (C14), pentadecanoic acid (C15), palmitic acid (C16), margaric acid (C17), stearic acid (C18), nonadecylic acid (C19), arachidic acid (C20), heneicosylic acid (C21), behenic acid (C22), tricosylic acid (C23), ligno-ceric acid (C24), pentacosylic acid (C25), cerotic acid (C26), heptacosylic acid (C27) and montanic acid (C28).

Examples of unsaturated fatty acids include α-linolenic acid (C18:3), stearidonic acid (C18:4), eicosapentaenoic acid (C20:5), docosahexaenoic acid (C22:6), linoleic acid (C18:2), γ-linolenic acid (C18:3), dihomo-γ-linolenic acid (C20:3), arachidonic acid (C20:4), adrenic acid (C22:4), palmitoleic acid (C16:1), vaccenic acid (C18:1), paullinic acid (C20:1), oleic acid (C18:1), elaidic acid (Ctrans-18:1), gondoic acid (C20:1), erucic acid (C22:1), nervonic acid (C24:1) and mead acid (C20:3).

The notation CM:N fatty (where M and N are integers), as used herein, means that the fatty acid comprises M carbon atoms and N double bonds. The N double bonds may be at any position (cis or trans configuration), although two double bonds are not usually adjacent (i.e. bonded to the same carbon atom). Thus, C18:0 (or simply C18) covers only octadecanoic acid (stearic acid) and C18:1 includes all fatty acids having 18 carbons and one double bond, such as oleic acid ((Z)-octadec-9-enoic acid) and vaccenic acid ((E)-octadec-11-enoic acid).

Convenient fatty acids to use include stearic acid, oleic acid and vaccenic acid, and in particular oleic acid. It can also sometimes be convenient to use mixtures of fatty acids.

The organofunctional network former for use as a surface modifier is preferably defined in the same way as it is above in the context of the method of the present invention (i.e. the method of coating a substrate). Thus, preferably the orga-nofunctional network former is a compound of formula (II) as defined above, with the reactive organic groups therein preferably being hydrocarbyl groups having one or more substituents selected from epoxy, amino, hydroxyl, thiol, acrylate, methacrylate, vinyl, allyl, alkenyl, alkynyl, car-boxyl, carboxylic anhydride, isocyanate, cyanate, ureido and carbamate (amino being most preferred). Thus, the organo-functional network former may be a compound selected from aminoalkyltrialkoxysilane, N-(alkyl)-aminoalkyltri-alkoxysilane, N-aminoalkyl-aminoalkyl(alkyl)dialkoxysi-lane, N-aminoalkyl-aminoalkyltrialkoxysilane, epoxyalkyl-trialkoxysilane, mercaptoalkyltrialkoxysilane, alkacrylo-xyalkyltrialkoxysilane (e.g. methacryloxyalkyltrialkoxysi-lane) and ureidoalkyltrialkoxysilane (with aminoalkyltri-alkoxysilane being most preferred). Preferably the alkyl moieties are each independently selected from $C_{1-10}$ alkyl, more preferably $C_{1-6}$ alkyl, such as $C_{1-4}$ alkyl. Preferably the alkoxy moieties are $C_{1-10}$ alkoxy, more preferably $C_{1-6}$ alkoxy, such as $C_{1-4}$ alkoxy (typically they are ethoxy or methoxy, most commonly ethoxy). And specific examples of suitable organofunctional network formers include the fol-lowing: 3-aminopropyltrimethoxysilane, 3-aminopropyltri-ethoxysilane, N-(n-butyl)-3-amino-propyltrimethoxysilane, N-(n-butyl)-3-amino-propyltriethoxysilane, N-2-amino-ethyl-3-aminopropyl(methyl)dimethoxysilane, N-2-amino-ethyl-3-aminopropyl(methyl)diethoxysilane, N-2-amino-ethyl-3-aminopropyltrimethoxysilane, N-2-aminoethyl-3-aminopropyltriethoxysilane, 3-glycidyloxypropyltrietho-xysilane, 3-glycidyloxypropyltrimethoxysilane, 3-mercap-topropyltrimethoxysilane, 3-mercaptopropyltriethoxysilane, 3-methacryloxypropyltrimethoxysilane, 3-methacryloxypropyltriethoxysilane, 3-ureidopropyltrimethoxysilane, and 3-ureidopropyltriethoxysilane (among which the amino-containing options are most preferred, in particular 3-ami-nopropyltrimethoxysilane and 3-aminopropyltriethoxysi-lane).

The organophosphorus compound is preferably used in an amount of ≥0.01 wt %, such as ≥0.04 wt %, ≥0.08 wt %, ≥0.1 wt %, or ≥0.2 wt % based on the total weight of coated pigment. The organophosphorus compound is preferably used in an amount of ≤15 wt %, such as ≤10 wt %, ≤5 wt %, ≤4 wt %, ≤3 wt %, ≤2 wt %, or ≤1 wt % based on the total weight of coated pigment. Thus, preferred amounts may be 0.1 to 10 wt %.

The compatibilizer is preferably used in an amount of ≥0.01 wt %, such as ≥0.04 wt %, ≥0.08 wt %, ≥0.1 wt %, or ≥0.2 wt % based on the total weight of coated pigment. The compatibilizer is preferably used in an amount of ≤15 wt %, such as ≤10 wt %, ≤5 wt %, ≤4 wt %, ≤3 wt %, ≤2 wt %, or ≤1 wt % based on the total weight of coated pigment. Thus, preferred amounts may be 0.1 to 10 wt %.

The fatty acid is preferably used in an amount of ≥0.01 wt %, such as ≥0.04 wt %, ≥0.08 wt %, ≥0.1 wt %, or ≥0.2 wt % based on the total weight of coated pigment. The fatty acid is preferably used in an amount of ≤15 wt %, such as ≤10 wt %, ≤5 wt %, ≤4 wt %, ≤3 wt %, ≤2 wt %, or ≤1 wt % based on the total weight of coated pigment. Thus, preferred amounts may be 0.1 to 10 wt %.

The organofunctional network former (when employed as a surface modifier) is preferably used in an amount of ≥0.01 wt %, such as ≥0.04 wt %, ≥0.08 wt %, ≥0.1 wt %, or ≥0.2 wt % based on the total weight of coated pigment. The organofunctional network former is preferably used in an amount of ≤15 wt %, such as ≤10 wt %, ≤5 wt %, ≤4 wt %, ≤3 wt %, ≤2 wt %, or ≤1 wt % based on the total weight of coated pigment. Thus, preferred amounts may be 0.1 to 10 wt %.

The weight ratio of organophosphorus compound to com-patibilizer (in aspects where both are used in combination) is preferably from 10:1 to 1:10, such as from 5:1 to 1:5, from 3:1 to 1:3, or from 2:1 to 1:2.

The weight ratio of fatty acid to compatibilizer (in aspects where both are used in combination) is preferably from 10:1 to 1:10, such as from 5:1 to 1:5, from 5:1 to 1:3, or from 4:1 to 1:2.

The weight ratio of organofunctional network former to organophosphorus compound (in aspects where both are used in combination) is preferably from 10:1 to 1:10, such as from 5:1 to 1:5, from 3:1 to 1:3, or from 2:1 to 1:2.

In one aspect of the invention, when the organophospho-rus compound and compatibilizer are applied, the above method comprises a step of applying the organophosphorous compound to the pigment, and subsequently a step in which the compatibilizer is applied to the pigment. More typically, though, when the organophosphorus compound and com-patibilizer are applied, the above method comprises a step of applying the compatibilizer to the pigment, and subse-quently a step in which the organophosphorous compound is applied to the pigment.

In one aspect of the invention, when the fatty acid and compatibilizer are applied, the above method comprises a step of applying the fatty acid to the pigment, and subse-quently a step in which the compatibilizer is applied to the pigment. More typically, though, when the fatty acid and compatibilizer are applied, the above method comprises a step of applying the compatibilizer to the pigment, and subsequently a step in which the fatty acid is applied to the pigment.

In one aspect of the invention, when the organofunctional network former and organophosphorus compound are applied, the above method comprises a step of applying the organophosphorous compound to the pigment, and subsequently a step in which the organofunctional network former is applied to the pigment. More typically, though, when the organofunctional network former and organophosphorus compound are applied, the above method comprises a step of applying the organofunctional network former to the pigment, and subsequently a step in which the organophosphorous compound is applied to the pigment.

When the organophosphorous compound is applied to the coated substrate, a basic catalyst may preferably be used. Preferred basic catalysts are EDA, MEA and NMI. Such agents may be used directly or in admixture with a solvent.

When the fatty acid is applied to the coated substrate, a basic catalyst may preferably be used. Preferred basic catalysts are EDA, MEA and NMI. Such agents may be used directly or in admixture with a solvent.

When the compatibilizer is applied to the coated substrate, a basic catalyst may preferably be used. Preferred basic catalysts are EDA, MEA and NMI. Such agents may be used directly or in admixture with a solvent.

When the organofunctional network former is applied to the coated substrate, a basic catalyst may preferably be used. Preferred basic catalysts are EDA, MEA and NMI. Such agents may be used directly or in admixture with a solvent.

The use of a combination of an organophosphorus compound and compatibilizer as defined above as surface modifiers for pigments, particularly coated pigments, has been found to offer surprising benefits in terms of the ability of pigments to withstand sheering effects when employed in polymer powder applications. The use of a combination of a fatty acid and compatibilizer as defined above as surface modifiers for pigments, particularly coated pigments, is believed to offer a similar benefit, as is the combination of an organofunctional network former and organophosphorus compound. In addition, the use, as surface modifiers for pigments (particularly coated pigments), of a combination of (a) an organophosphorus compound and a compatibilizer as defined above, (b) a fatty acid and a compatibilizer as defined above, or (c) an organofunctional network former and a organophosphorus compound, has been found to offer surprising benefits in terms of the ability of pigments to avoid gassing in water-borne applications. These benefits are believed to arise generally with pigments and not to be restricted to the coated pigments of the invention as defined herein. Accordingly, as noted above:

in one embodiment the invention provides a method of treating a pigment (any pigment, but preferably a coated pigment, such as the coated pigment of the present invention), the method comprising simultaneously, separately or sequentially applying one or more surface modifiers to the pigment, wherein said one or more surface modifiers include an organophosphorous compound and a compatibilizer as defined above, and wherein a major part of the compatibilizer does not become covalently bonded to the pigment;

in another embodiment the invention provides a method of treating a pigment (any pigment, but preferably a coated pigment, such as the coated pigment of the present invention), the method comprising simultaneously, separately or sequentially applying one or more surface modifiers to the pigment, wherein said one or more surface modifiers include a fatty acid and a compatibilizer as defined above, and wherein a major part of the compatibilizer does not become covalently bonded to the pigment; and in another embodiment the invention provides a method of treating a pigment (any pigment, but preferably a coated pigment, such as the coated pigment of the present invention), the method comprising simultaneously, separately or sequentially applying one or more surface modifiers to the pigment, wherein said one or more surface modifiers include an organofunctional network former and an organophosphorous compound.

Preferred aspects of the surface modification of the invention as defined above apply (independently) similarly to each of these three embodiments.

In a further embodiment, the present invention provides a pigment (preferably a coated pigment of the invention) having on its surface an organophosphorous compound and a compatibilizer as defined above, wherein a major part of the compatibilizer is not covalently bonded to the pigment. Preferred aspects of the surface modification of the invention as defined above apply similarly to this embodiment.

In a further embodiment, the present invention provides a pigment (preferably a coated pigment of the invention) having on its surface a fatty acid and a compatibilizer as defined above, wherein a major part of the compatibilizer is not covalently bonded to the pigment. Preferred aspects of the surface modification of the invention as defined above apply similarly to this embodiment.

In a further embodiment, the present invention provides a pigment (preferably a coated pigment of the invention) having on its surface an organofunctional network former and an organophosphorous compound as defined above. Preferred aspects of the surface modification of the invention as defined above apply similarly to this embodiment.

Applications and Uses of the Coated Pigments

The coated pigments of the invention may be used for a wide range of purposes in view of their beneficial properties. Thus, they may be incorporated into products such as varnishes, automobile finishes, paints, printing inks, powder coating materials, architectural paints, plastics, security printing inks, ceramics, glass or cosmetic agents. In one preferred embodiment the present invention provides a powder coating material comprising a coated pigment of the invention as defined herein and which further comprises a polymer.

In another preferred embodiment the invention provides an aqueous coating composition (such as a paint) comprising a coated pigment of the invention as defined herein. Pigments which are particularly preferred in the context of this embodiment include those in which (a) the pigment has on its surface an organofunctional network former and an organophosphorus compound, and/or (b) the pigment is obtained or obtainable by a method comprising simultaneously, separately or sequentially applying one or more surface modifiers to the pigment, wherein said one or more surface modifiers include an organofunctional network former and an organophosphorus compound. The preferred aspects of the invention set out above in the section entitled "Surface modification of coated substrates" apply equally to both of cases (a) and (b). Also, it may be noted that in both of cases (a) and (b) the pigment is preferably a coated pigment of the invention, i.e. a pigment as defined above in the section entitled "The coated substrate". Thus, in this embodiment the pigment is preferably obtainable by method of coating a pigment substrate and then applying one or more surface modifiers to the (thus obtained) coated pigment substrate, wherein the method of coating the pigment substrate comprises (a) a step of subjecting an inorganic network former and an organofunctional network former to a condensation-type reaction, and subsequently (b) one or more further steps in which an inorganic network former and an organofunctional network former are subjected to a condensation-type reaction; and applying one or more surface modifiers to the (thus obtained) coated pigment substrate, wherein said one or more surface modifiers include both (i) an organofunctional network former, and (ii) an organophosphorus compound.

The coated pigments of the invention may advantageously be used in the form of powder coating materials. Thus, the invention provides a method of coating an article, which method comprises electrostatically applying a powder coating material comprising a coated pigment of the invention as defined herein (and optionally a polymer) to an article, and, optionally, curing the applied coating material. The article could be an automobile.

The present invention also provides a coated article comprising a coated substrate of the invention as defined herein.

EXAMPLES

Examples 1 to 9—Preparation of Coated Substrates

The following Examples provide details on the production of certain coated pigments of the invention.

Example 1—Two Layers (First Epoxy-Functionalized, Second Epoxy-Functionalised)

Reactants:

Initial feed: 0.1 kg Al flakes in paste form, $d_{50}$ between 10 and 15 μm (amount refers to non-volatile content)

First layer application: 0.1 kg tetraethylsilicate (TEOS)
  3 g epoxyalkyltrialkoxysilane Second layer application: 0.1 kg TEOS
  5 g epoxyalkyltrialkoxysilane Surface treatment part A: 1 g alcohol-etherified melamine-formaldehyde resin in isobutanol (amount refers to the amount of resin)

Surface treatment part B: 2 g octylphosphonic acid diluted in IPA

Processing:

| Step | Description | Time/comments |
|------|-------------|---------------|
| 1 | The initial feed + 0.4 kg IPA solvent + first layer ingredients were loaded into a reactor, and stirred | 15 minutes room temperature 30 min reflux |
| 2 | 2 g EDA + 0.05 kg water + 0.1 kg IPA were added over two portions; stirring and reflux continued | 2 hr/pH maintained at 9-10 |
| 3 | The second layer ingredients were added; stirring and reflux continued | 1 hr |
| | Surface treatment part A ingredient plus an aqueous solution of EDA were added (total EDA added was 1 g); stirring and reflux continued | 1 hr |
| 5 | Surface treatment part B ingredient was added; stirring and reflux continued | 1 hr |
| 6 | Aqueous solution of EDA added (total EDA added was 1 g); stirring and reflux continued | 3 hr |
| 7 | The product was cooled, the solvent removed by filtration, and the cake washed with 0.1 kg IPA; the product was then dried in an oven at 85° C. | Filtrate: yellow, clear pH 8-9 Yield: 159 g |

Example 2—Two Layers (First Amino-Functionalized, Second Epoxy-Functionalised)

A coated pigment was prepared in the same way as in Example 1, subject to using 2 g of N-aminoalkyl-aminoalkyltrialkoxysilane in the first layer application, instead of 3 g of epoxyalkyltrialkoxysilane. The filtrate in Step 8 was yellow, clear pH 8-9. The product yield was 158 g.

Example 3—Two Layers (First Epoxy-Functionalized, Second Epoxy-Functionalised)

Reactants:
Initial feed: 0.1 kg Al flakes in paste form, $d_{50}$ between 10 and 15 µm (amount refers to non-volatile content)

First layer application: 0.1 kg tetraethylsilicate (TEOS)
3 g epoxyalkyltrialkoxysilane Second layer application: 0.1 kg TEOS
6 g epoxyalkyltrialkoxysilane Surface treatment part A: 1 g alcohol-etherified melamine-formaldehyde resin in isobutanol (amount refers to the amount of resin)

Surface treatment part B: 3 g octylphosphonic acid (80% solution in water) diluted in 1-methoxy-2-propanol (amount refers to the amount of octylphosphonic acid in water)

Processing:

| Step | Description | Time/comments |
|---|---|---|
| 1 | The initial feed + 0.4 kg 1-methoxy-2-propanol solvent + first layer ingredients were loaded into a reactor, and stirred | 15 minutes room temperature 30 min reflux |
| 2 | 2 g EDA + 0.05 kg water + 0.07 kg 1-methoxy-2-propanolwere added over two portions; stirring and reflux continued | 2 hr/pH maintained at 9-10 |
| 3 | The second layer ingredients were added; stirring and reflux continued | 1 hr |
| 4 | Surface treatment part A ingredient plus an aqueous solution of EDA were added (total EDA added was 1 g); stirring and reflux continued | 1 hr |
| 5 | Surface treatment part B ingredient was added; stirring and reflux continued | 1 hr |
| 6 | Aqueous solution of EDA was added (total EDA added was 1 g); stirring and reflux continued | 3 hr |
| 7 | The product was cooled, the solvent removed by filtration, and the cake washed with 0.1 kg 1-methoxy-2-propanol; the product was then dried in an oven at 85° C. | Filtrate: dark yellow, clear pH 9 Yield: 167 g |

Example 4—Three Layers (First, Second and Third Epoxy-Functionalized)

Reactants:
Initial feed: 0.1 kg Al flakes in paste form, $d_{50}$ between 10 and 15 µm (amount refers to non-volatile content)
First layer application: 0.1 kg tetraethylsilicate (TEOS)
2 g epoxyalkyltrialkoxysilane
Second layer application: 0.1 kg TEOS
3 g epoxyalkyltrialkoxysilane
Third layer application: 0.03 kg TEOS
5 g epoxyalkyltrialkoxysilane
Surface treatment part A: 1 g alcohol-etherified melamine-formaldehyde resin in isobutanol (amount refers to the amount of resin)
Surface treatment part B: 3 g octylphosphonic acid (80% solution in water) diluted in IPA (amount refers to the amount of octylphosphonic acid in water)
Processing:

| Step | Description | Time/comments |
|---|---|---|
| 1 | The initial feed + 0.4 kg IPA solvent + first layer ingredients were loaded into a reactor, and stirred | 15 minutes room temperature 30 min reflux |
| 2 | 2 g EDA + 0.05 kg water + 0.07 kg IPA were added over two portions; stirring and reflux continued | 2 hr/pH maintained at 9-10 |
| 3 | The second layer ingredients were added; stirring and reflux continued | 1 hr |
| 4 | The third layer ingredients + an aqueous solution of EDA were added (total EDA added was 1 g); stirring and reflux continued | 1 hr |

-continued

| Step | Description | Time/comments |
|------|-------------|---------------|
| 5 | Surface treatment part A ingredient was added; stirring and reflux continued | 1 hr |
| 6 | Surface treatment part B ingredient plus an aqueous solution of EDA were added (total EDA added was 1 g); stirring and reflux continued | 3 hr |
| 7 | The product was cooled, the solvent removed by filtration, and the cake washed with 0.1 kg IPA; the product was then dried in an oven at 85° C. | Filtrate: yellow, clear pH 8-9 Yield: 164 g |

Example 5—Three Layers (First, Second and Third Epoxy-Functionalized)

Reactants:

Initial feed: 0.1 kg Al flakes in paste form, $d_{50}$ between 10 and 15 μm (amount refers to non-volatile content)

First layer application: 0.1 kg tetraethylsilicate (TEOS)
    2 g epoxyalkyltrialkoxysilane Second layer application: 0.1 kg TEOS
    3 g epoxyalkyltrialkoxysilane Third layer application: 0.03 kg TEOS
    5 g epoxyalkyltrialkoxysilane Surface treatment part A: 1 g alcohol-etherified melamine-formaldehyde resin in isobutanol (amount refers to the amount of resin)

Surface treatment part B: 3 g octylphosphonic acid (80% solution in water) diluted in 1-methoxy-2-propanol (amount refers to the amount of octylphosphonic acid in water)

Processing:

| Step | Description | Time/comments |
|------|-------------|---------------|
| 1 | The initial feed + 0.4 kg 1-methoxy-2-propanol solvent + first layer ingredients were loaded into a reactor, and stirred | 15 minutes room temperature 30 min reflux |
| 2 | 2 g EDA + 0.05 kg water + 0.07 kg 1-methoxy-2-propanol were added over two portions; stirring and reflux continued | 2 hr/pH maintained at 9-10 |
| 3 | The second layer ingredients were added; stirring and reflux continued | 1 hr |
| 4 | The third layer ingredients + an aqueous solution of EDA were added (total EDA added was 1 g); stirring and reflux continued | 1 hr |
| 5 | Surface treatment part A ingredient was added; stirring and reflux continued | 1 hr |
| 6 | Surface treatment part B ingredient plus an aqueous solution of EDA were added (total EDA added was 1 g); stirring and reflux continued | 3 hr |
| 7 | The product was cooled, the solvent removed by filtration, and the cake washed with 0.1 kg 1-methoxy-2-propanol; the product was then dried in an oven at 85° C. | Filtrate: yellow, clear pH 8-9 Yield: 164 g |

Example 6—One Layer (Epoxy-Functionalized) [Comparative Example]

Reactants:

Initial feed: 0.1 kg Al flakes in paste form, $d_{50}$ between 10 and 15 μm (amount refers to non-volatile content)

First (only) layer application: 0.2 kg tetraethylsilicate (TEOS) 9 g epoxyalkyltrialkoxysilane Surface treatment part A: 1 g alcohol-etherified melamine-formaldehyde resin in isobutanol (amount refers to the amount of resin)

Surface treatment part B: 3 g octylphosphonic acid (80% solution in water) diluted in 1-methoxy-2-propanol (amount refers to the amount of octylphosphonic acid in water)

Processing:

| Step | Description | Time/comments |
|---|---|---|
| 1 | The initial feed + 0.4 kg 1-methoxy-2-propanol solvent + first layer ingredients were loaded into a reactor, and stirred | 15 minutes room temperature 30 min reflux |
| 2 | 2 g monoethanolemaine (MEA) + 0.05 kg water + 0.07 kg 1-methoxy-2-propanol were added over two portions; stirring and reflux continued | 2 hr/pH maintained at 9-10 |
| 3 | Surface treatment part A ingredient was added; stirring and reflux continued | 1 hr |
| 4 | Surface treatment part B ingredient plus an aqueous solution of MEA were added (total MEA added was 1 g); stirring and reflux continued | 3 hr |
| 5 | The product was cooled, the solvent removed by filtration, and the cake washed with 0.1 kg 1-methoxy-2-propanol; the product was then dried in an oven at 85° C. | Filtrate: yellow, clear pH 8-9 Yield: 164 g |

Example 7—Two Layers (First Epoxy-Functionalized, Second Epoxy-Functionalised)

Reactants:
Initial feed: 0.1 kg Al flakes in paste form, $d_{50}$ between 10 and 15 µm (amount refers to non-volatile content)
First layer application: 0.1 kg tetraethylsilicate (TEOS) 4 g epoxyalkyltrialkoxysilane
Second layer application: 0.1 kg TEOS 5 g epoxyalkyltrialkoxysilane
Surface treatment part A: 1 g alcohol-etherified melamine-formaldehyde resin in isobutanol (amount refers to the amount of resin)
Surface treatment part B: 3 g octylphosphonic acid (80% solution in water) diluted in 1-methoxy-2-propanol (amount refers to the amount of octylphosphonic acid in water)
Processing:

Example 8—Three Layers (First, Second and Third Epoxy-Functionalized)

Reactants:
Initial feed: 0.1 kg Al flakes in paste form, $d_{50}$ between 10 and 15 µm (amount refers to non-volatile content)
First layer application: 0.1 kg tetraethylsilicate (TEOS) 2 g epoxyalkyltrialkoxysilane
Second layer application: 0.1 kg TEOS 3 g epoxyalkyltrialkoxysilane
Third layer application: 0.03 kg TEOS 5 g epoxyalkyltrialkoxysilane
Surface treatment part A: 1 g alcohol-etherified melamine-formaldehyde resin in isobutanol (amount refers to the amount of resin)
Surface treatment part B: 3 g octylphosphonic acid (80% solution in water) diluted in 1-methoxy-2-propanol (amount refers to the amount of octylphosphonic acid in water)

| Step | Description | Time/comments |
|---|---|---|
| 1 | The initial feed + 0.4 kg 1-methoxy-2-propanol solvent + first layer ingredients were loaded into a reactor, and stirred | 15 minutes room temperature 30 min reflux |
| 2 | 2 g MEA + 0.05 kg water + 0.1 kg 1-methoxy-2-propanol were added over two portions; stirring and reflux continued | 2 hr/pH maintained at 9-10 |
| 3 | The second layer ingredients were added; stirring and reflux continued | 1 hr |
| 4 | Surface treatment part A ingredient plus an aqueous solution of MEA were added (total MEA added was 1 g); stirring and reflux continued | 1 hr |
| 5 | Surface treatment part B ingredient was added; stirring and reflux continued | 1 hr |
| 6 | Aqueous solution of MEA was added (total MEA added was 1 g); stirring and reflux continued | 3 hr |
| 7 | The product was cooled, the solvent removed by filtration, and the cake washed with 0.1 kg 1-methoxy-2-propanol; the product was then dried in an oven at 85° C. | Filtrate: yellow, clear pH 8-9 Yield: 162 g |

Processing:

| Step | Description | Time/comments |
|---|---|---|
| 1 | The initial feed + 0.4 kg 1-methoxy-2-propanol solvent + first layer ingredients were loaded into a reactor, and stirred | 15 minutes room temperature 30 min reflux |
| 2 | 2 g MEA + 0.05 kg water + 0.09 kg 1-methoxy-2-propanol were added over two portions; stirring and reflux continued | 2 hr/pH maintained at 9-10 |
| 3 | The second layer ingredients were added; stirring and reflux continued | 1 hr |
| 4 | The third layer ingredients + an aqueous solution of MEA were added (total MEA added was 1 g); stirring and reflux continued | 1 hr |
| 5 | Surface treatment part A ingredient was added; stirring and reflux continued | 1 hr |
| 6 | Surface treatment part B ingredient plus an aqueous solution of MEA were added (total MEA added was 1 g); stirring and reflux continued | 3 hr |
| 7 | The product was cooled, the solvent removed by filtration, and the cake washed with 0.1 kg 1-methoxy-2-propanol; the product was then dried in an oven at 85° C. | Filtrate: yellow, clear pH 8-9 Yield: 168 g |

Example 9—Three Layers (First, Second and Third Epoxy-Functionalized)

Reactants:

Initial feed: 0.1 kg Al flakes in paste form, $d_{50}$ between 10 and 15 µm (amount refers to non-volatile content)

First layer application: 0.1 kg tetraethylsilicate (TEOS)
2 g epoxyalkyltrialkoxysilane Second layer application: 0.1 kg TEOS
3 g epoxyalkyltrialkoxysilane Third layer application: 0.03 kg TEOS
5 g epoxyalkyltrialkoxysilane Surface treatment part A: 1 g alcohol-etherified melamine-formaldehyde resin in isobutanol (amount refers to the amount of resin)

Surface treatment part B: 3 g octylphosphonic acid (80% solution in water) diluted in 1-methoxy-2-propanol (amount refers to the amount of octylphosphonic acid in water)

Processing:

| Step | Description | Time/comments |
|---|---|---|
| 1 | The initial feed + 0.4 kg 1-methoxy-2-propanol solvent + first layer ingredients were loaded into a reactor, and stirred | 15 minutes room temperature 30 min reflux |
| 2 | 3 g N-methyl imidazole + 0.05 kg water + 0.07 kg 1-methoxy-2-propanol were added over two portions; stirring and reflux continued | 2 hr/pH maintained at 9-10 |
| 3 | The second layer ingredients were added; stirring and reflux continued | 1 hr |
| 4 | The third layer ingredients + an aqueous solution of N-methyl imidazole added (total N-methyl imidazole added was 2 g); stirring and reflux continued | 1 hr |
| 5 | Surface treatment part A ingredient was added; stirring and reflux continued | 1 hr |
| 6 | Surface treatment part B ingredient plus an aqueous solution of N-methyl imidazole were added (total N-methyl imidazole added was 2 g); stirring and reflux continued | 3 hr |
| 7 | The product was cooled, the solvent removed by filtration, and the cake washed with 0.1 kg 1-methoxy-2-propanol; the product was then dried in an oven at 85° C. | Filtrate: yellow, clear pH 8-9 Yield: 168 g |

Examples 10 to 40—Application and Evaluation of Coated Pigments

The following section describes how the coated pigments of the invention may be formulated into a powder coating and subsequently applied to an article.

Measurement of Chemical Resistivity of Coated Pigments

The basic method is to blend powder pigments with powder coatings and apply them to a surface with a spray gun, and then apply drops of acid and base for different time periods and assess the impact thereof. A more detailed description of the method follows below.

Test Method for Measuring Chemical Resistivity of Coated Pigments

A chemical resistivity score may be determined by the following method:

(a) the coated pigment is filled directly into a mixing vessel with polyester powder, wherein if the coated pigment has an average particle size ($d_{50}$) ≥20 micron as measured by laser diffraction then 188 g of polymer powder is used with 12 g of coated pigment, and if the coated pigment has an average particle size ($d_{50}$)≤20 micron as measured by laser diffraction then 192 g of polymer powder is used with 8 g of coated pigment;

(b) if the coated pigment is not all beneath the level of the mixing tool in the mixing vessel, the mixing vessel is swayed to bring all of the coated pigment below the level of the mixing tool;

(c) the polyester powder and coated pigment are blended for 2*30 seconds at ambient temperature (the preferred apparatus is a Thermomix™ 3300, company Vorwerk, with the mixing being conducted at blender level 1);

(d) the resulting powder preparation is transferred into a plastic bag;

(e) the powder preparation is applied onto steel panels (a suitable panel is the 10*15 cm panel available from company Q-Lab, Typ D-46) using an electrostatic spray gun (a suitable spray gun is Typ: WX-101 TC) having a circular metallic nozzle and a 30 mm deflector, and employing the following parameters:
connection of powder hose: 2 bar
connection of purge airf: 0.5 kg/cm$^2$
material flow controller: 50%
voltage: 70 kV
gun-panel distance: 30 cm;
wherein the amount of preparation applied is sufficient to provide a thickness of 50 to 75 micron following the curing step (f) below
(and wherein if spitting and/or caking at the spray gun occurs then the test is abandoned and restarted);

(f) curing the thus applied preparation using a baking time of 160° C. for 8 minutes;

(g) the resulting sample is kept at ambient temperature for at least 24 hours;

(h) the sample is placed level onto a magnetic pad, and 15 to 17 mm drops of the following solutions are placed onto it: (i) a 10% aqueous solution by weight of hydrochloric acid, (ii) a 1 M aqueous solution of sodium hydroxide, and (iii) a 10% aqueous solution by weight of sodium hydroxide (NaOH), whereby the drops are placed chronologically such that after 240 minutes all drops can be removed simultaneously, and for each solution the panel will have been exposed one drop of it for 30 minutes, one drop of it for 60 minutes, one drop of it for 120 minutes, one drop of it 180 minutes, and one drop of it for 240 minutes;

(i) all drops are simultaneously removed from the sample by rinsing with water;

(j) each of the fifteen drop areas is evaluated visually with respect to the degree of greying, and is assigned a score from 0 to 3 based on the following scheme:
0 no attack
0.5 slight changes can only be observed at certain angles
1 slight greying
2 greying, pigmentation still visible)
3 complete greying, no pigmentation visible)

(k) the scores for each drop area are then summed to provide a total score from 0 to 45.

Steps (a) to (g) may also be carried out using an uncoated pigment in connection with measurement of the lightness reduction value as defined herein. The polyester powder is no particularly limited in this context as its purpose is just to act as a carrier for the coated pigment. A convenient polyester powder to use is one that is free of triglycidyl isocyanurate (TGIC), suitable for manufacturing gloss paint films, and/or having high flow covering characteristics (e.g. FA-9005-GL412 powder which is available from Ganzlin Beschichtungspulver GmbH).

Test Method for Measuring the Gloss of Coated Pigments

Gloss may be measured by preparing a sample containing the coated or uncoated pigment according to steps (a) to (g) of the "Test method for measuring chemical resistivity of coated pigments" set out in the description, and then using a glossmeter to measure the gloss at 60°. An example of a suitable glossmeter is the Rhopoint Instruments Novo-Gloss 60° glossmeter.

Test Method for Measuring the Lightness of Coated Pigments

Lightness at 15° and −15° may be measured by preparing a sample containing the coated or uncoated pigment according to steps (a) to (g) of the "Test method for measuring chemical resistivity of coated pigments" set out in the description, and then using a spectrophotometer. An example of a suitable spectrophotometer is the BYK-mac i 23 mm spectrophotometer.

Test Method for Measuring the Minimum Ignition Energy (MIE) of Coated Pigments

MIE provides a measure of the minimum energy of an electrical spark that will result in ignition of a cloud of particulate material under specified test conditions. To measure MIE, the particulate material is dispersed in an explosion vessel to form a cloud, and sparks of known energy are passed through the cloud. By varying the concentration of the particles, the level of turbulence and the spark energy, the lowest energy capable of igniting the cloud can be determined. MIE is preferably measured according to BS ISO/IEC 80079-20-2.

Test Method for Measuring the Surface Area of Coated Pigments

As used herein, references to surface area are intended to refer to surface area as determined by the BET method. Such a surface area may be measured according to ASTM B922-17.

Examples 10 to 26—Chemical Resistance and Optical Properties of Coated Pigments A range of different pigments were tested in accordance with the above Test methods and the results are set out in the table below. Examples 10 to 21 are of the invention. The samples tested for these Examples were each prepared using either (i) one of the coated pigments described in one of the above Examples, or (ii) an alternative coated pigment prepared in a similar way, subject to using different reagents (the differences are noted in the table). Example 22 was a corresponding pigment which lacked any coating at all, and was included as a Comparative Example. Examples 23 to 26 contained coated pigments wherein the coating was not made using the process of the present invention—again the differences are noted in the table.

| Example no. | Coated pigment | Details of preparation of coated pigment | | | | |
|---|---|---|---|---|---|---|
| | | Solvent | Catalyst | Layers | Post treatment | Linking chemistry |
| Inventive Examples: | | | | | | |
| 10 | Example 1 | IPA | EDA | 2 | Luwipal 072/OPA | Epoxy Silane |
| 11 | Example 2 | IPA | EDA | 2 | Luwipal 072/OPA | Epoxy silane + Amino silane |

-continued

| | | | | | | |
|---|---|---|---|---|---|---|
| 12 | Example 3 | MP* | EDA | 2 | Luwipal 072/OPA | Epoxy silane |
| 13 | Other | MP* | EDA | 3 | Luwipal 072/OPA | Epoxy silane |
| 14 | Other | MP* | EDA | 3 | Desmodur Z4470/OPA | Epoxy silane |
| 15 | Example 7 | MP* | MEA | 2 | Luwipal 072/OPA | Epoxy silane |
| 16 | Example 8 | MP* | MEA | 3 | Luwipal 072/OPA | Epoxy silane |
| 17 | Other | MP* | MEA | 2 | Luwipal 072/OPA | Amino Silane + Acrylate Silane |
| 18 | Other | MP* | MEA | 2 | Luwipal 072/OPA | Acrylate silane + Amino silane |
| 19 | Other | MP* | MEA | 3 | Luwipal 072/no OPA | Epoxy silane |
| 20 | Other | MP* | NMI | 3 | Desmodur Z4470/OPA | Epoxy silane |
| 21 | Other | MP* | NMI | 2 | Desmodur Z4470/OPA | Epoxy silane |
| Comparative Examples: | | | | | | |
| 22 | Uncoated pigment | N/A - pigment was just the feed (starting pigment material) with no coating | | | | |
| 23 | Example 6 | MP* | MEA | 1 | Luwipal 072/OPA | Epoxy silane |
| 24 | Other | MP* | EDA | 1 | Luwipal 072/OPA | Epoxy silane |
| 25 | Other | MP* | MEA | 2 | Luwipal 072/OPA | N/A** |
| 26 | Other | MP* | MEA | 3 | Luwipal 072/OPA | N/A** |

| Example no. | Coated pigment | Chemical resistance | Gloss at 60° (Gloss variance) | Lightness (lightness variance) | |
|---|---|---|---|---|---|
| | | | | −15° | 15° |
| Inventive Examples: | | | | | |
| 10 | Example 1 | 8 | 76.2 (1.8) | 99.02 (107) | 87.50 (105) |
| 11 | Example 2 | 8.5 | 81.7 (0.56) | 91.02 (98) | 82.08 (99) |
| 12 | Example 3 | 8.5 | 78.7 (1.4) | 92.58 (99) | 83.00 (100) |
| 13 | Other | 8 | 77.5 (1.5) | 99.07 (107) | 89.96 (108) |
| 14 | Other | 10 | 76.5 (2.9) | 107.24 (116) | 96.81 (117) |
| 15 | Example 7 | 9 | 72.0 (3.5) | 107.21 (116) | 96.13 (116) |
| 16 | Example 8 | 8 | 74.0 (2.3) | 109.04 (118) | 97.62 (118) |
| 17 | Other | 9 | 83.3 (0.15) | 114.42 (123) | 103.92 (125) |
| 18 | Other | 9 | 76.9 (2.1) | 97.98 (106) | 87.91 (106) |
| 19 | Other | 11 | 82.0 (1.1) | 102.96 (111) | 92.43 (111) |
| 20 | Other | 8 | 78.4 (1.3) | 110.27 (119) | 98.25 (118) |
| 21 | Other | 9 | 77.3 (1.9) | 89.13 (96) | 80.58 (97) |
| Comparative Examples: | | | | | |
| 22 | Uncoated pigment | 31 | 83.8 (N/A) | 92.74 (N/A) | 83.02 (N/A) |
| 23 | Example 6 | 12 | 74.2 (11.5) | 97.14 (105) | 86.61 (104) |
| 24 | Other | 12 | 79.2 (5.5) | 96.52 (104) | 83.91 (101) |
| 25 | Other | 21 | 78.4 (N/A) | 73.61 (79) | 66.77 (80) |
| 26 | Other | 21 | 78.5 (N/A) | 79.20 (85) | 72.38 (87) |

*MP = 1-methoxy-2-propanol
**the TEOS and organosilane reagents were not added in combination (the epoxy silane reagent was added at the end)

It can be seen from the results in the above table that the inventive Examples enjoy an excellent combination of high chemical resistivity and good optical properties. Also, a comparison of the chemical resistivity scores of Examples 16 and 19 reveals that the use of an organophosphorus compound (in combination with the compatibilizer) for surface modification has the effect of enhancing the ability of pigments to withstand sheering effects when employed in polymer powder applications.

Examples 27 to 30—Comparison with Commercial Products

To further illustrate the present invention, and also demonstrate the difference between the coating of the present invention and the coatings used in the art, two coated pigments of the present invention were compared against two leading commercial coated pigments. The pigments were subjected to a chemical resistance test using a modified version of the "Test method for measuring chemical resistivity of coated pigments" set out above, wherein a different polymer powder was used to the specified polyester one, namely Alesta AP RAL 9005 HAA, which is commercially available from Axalta Coatings, and wherein only two solutions were used in step (h), namely solutions (iv) (5% aqueous NaOH solution) and (v) (20% aqueous HCl solution), and the drops of solution were left on the samples for time periods of 1, 2, 3 and 24 hours (instead of the time periods noted in step (h)). Images of the samples following the testing are reproduced in FIGS. 1 and 2. The samples were all prepared and tested in the same way, subject to using different coated pigments—to that end, the coated pigments used in each sample were as follows:

the sample labelled "35-1" was prepared using the coated pigment of Example 1 (this sample will be referred to below as Example 27), the sample labelled "35-2" was prepared using the coated pigment of Example 2 (this sample will be referred to below as Example 28), the sample labelled "PCU1000" was prepared using the commercial product PCU 1000 Aluminium Powder sold by Eckart, which has been described as being the best Al pigment product in the market in terms of chemical resistance (albeit at the expense to some extent of its optical properties), and is believed to feature an inner inorganic coating derived from TEOS plus an outer organic coating based on acrylate (this sample will be referred to below as Example 29 and is a Comparative Example), and the sample labelled "POWDAL 8500" was prepared using the commercial coated Al pigment product POWDAL 8500 sold by Schlenk, which it is believed may be based primarily on $SiO_2$ (this sample will be referred to below as Example 30 and is a Comparative Example).

Figure 1:
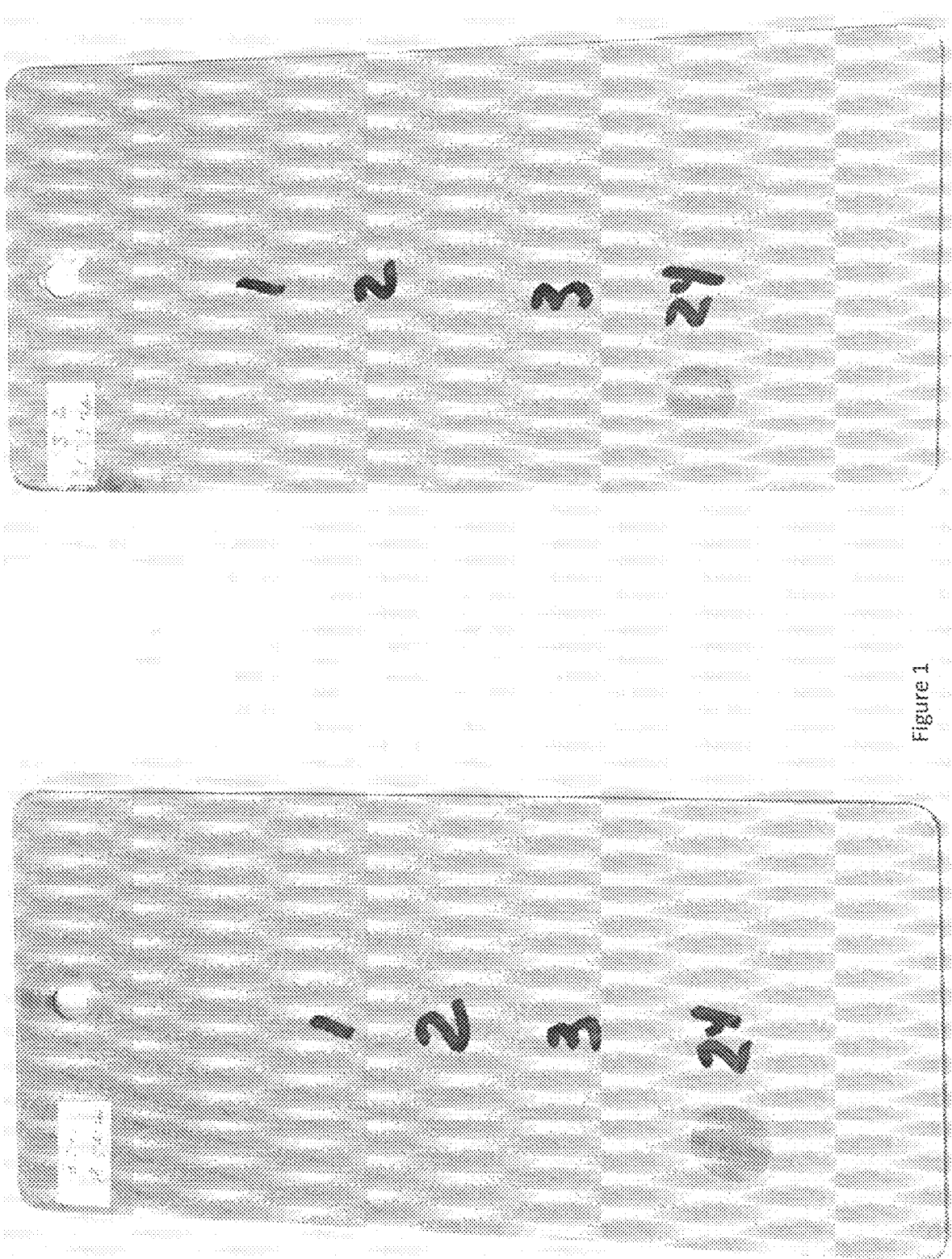
FIG. 1 shows images of two test samples, each prepared from a polymer powder plus a coated pigment of the invention and having been subjected to chemical resistivity testing.
Figure 2:
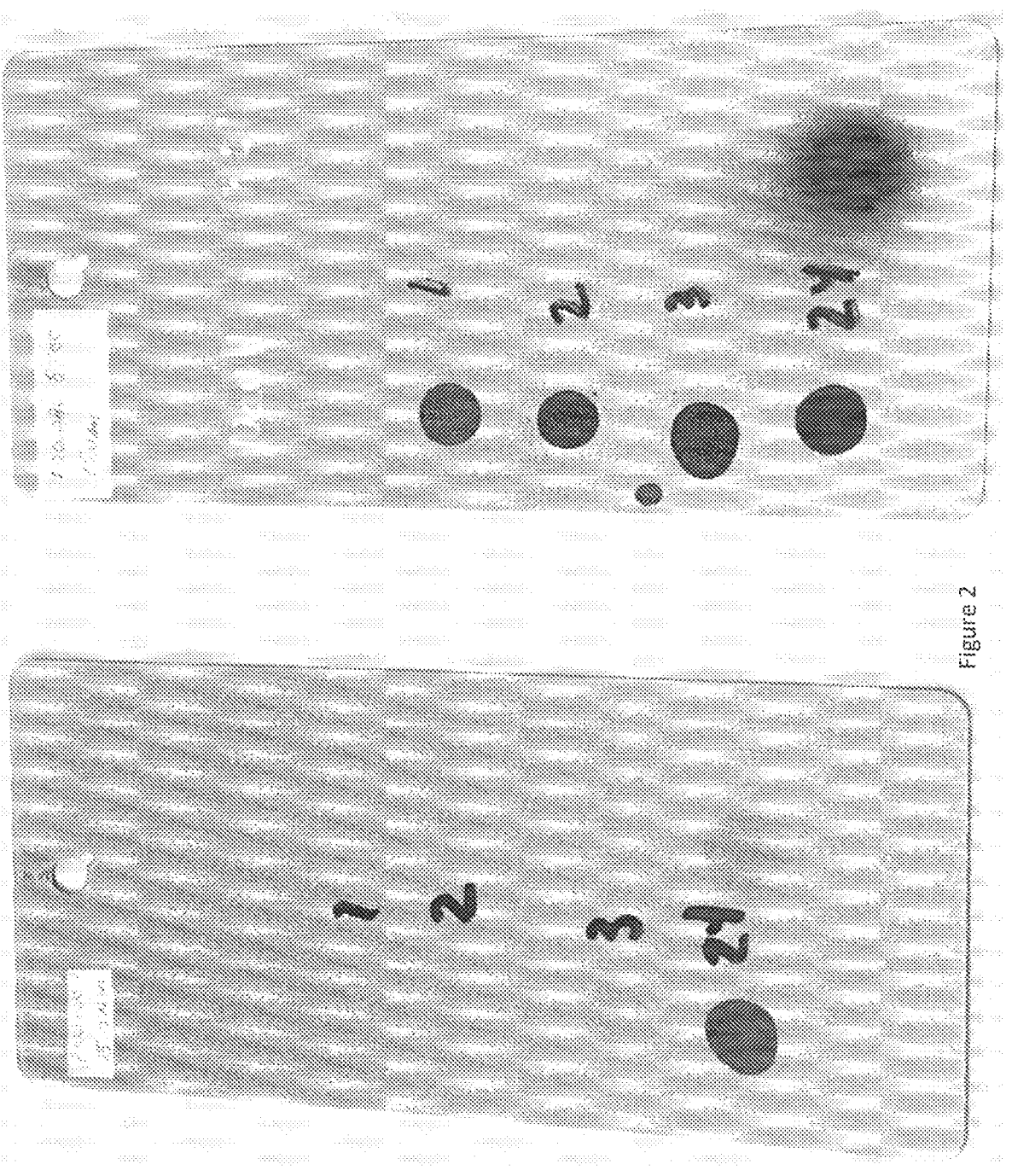
FIG. 2 shows, for comparative purposes, images of two corresponding samples, each prepared from a different commercially available pigment.

In all four of the samples shown in FIGS. 1 and 2, the arrangements of the drops was the same as is indicated for the sample containing POWDAL 8500, i.e. the drops of sodium hydroxide were placed on the left hand side of each sample and the drops of hydrochloric acid on the right. It may also be noted that in each case the coated pigments were of comparable particle size—as indicated in the images, the coated pigments had particle sizes ($d_{50}$) of 13.5 μm, 15.5 μm, 15 μm and 15 μm in Examples 27, 28, 29 and 30, respectively.

In terms of the results, it can be seen from the images for Examples 29 and 30 (in FIG. 2) that, as expected, the sample prepared using the PCU 1000 product outperforms the one prepared using POWDAL 8500 in terms of chemical resistance in the presence of both acid and base, but also has inferior optical appearance in terms of brightness and distinction of image. However, the two samples prepared using the coated pigment of the invention in Examples 27 and 28 (in FIG. 1) perform significantly better than either of the samples prepared using commercial products, and despite this they also have an excellent optical appearance which is comparable to that of the sample prepared using POWDAL 8500.

Examples 31 to 34—Further Comparisons with Commercial Products

To further illustrate the present invention, and also demonstrate the difference between the coated pigment of Example 1 and the commercial coated pigment PCU 1000 (discussed in Example 29 above), both coated pigments were compared in three different tests, each one being a modified version of the "Test method for measuring chemical resistivity of coated pigments" set out above, wherein a clear coat polymer powder was used, namely a polyester powder AR-0134-GL440 021 Transparent, PT 910, which is available from Ganzlin Beschichtungspulver GmbH. Images of the samples following the testing are reproduced in FIGS. 4 and 5. In each individual Figure the two adjacent samples were prepared in the same way and differed only in terms of the coated pigment used. The methods used to prepare the samples in FIGS. 4 and 5 differed in terms of whether or not significant shearing was applied—the samples in FIG. 4 were blended/mixed without using a blender apparatus (i.e. without significant shear being applied), whereas the samples in FIG. 5 were blended/mixed in a blender apparatus (i.e. with significant shear being applied). The samples prepared using the coated pigment of Example 1 appear on the left hand side of each of FIGS. 4 and 5, and will be referred to below as Examples 31 and 33, respectively. The samples prepared using the coated pigment PCU 1000 appear on the right hand side of each of FIGS. 4 and 5, and will be referred to below as Examples 32 and 34, respectively (these are Comparative Examples).

In the samples shown in FIGS. 4 and 5, the arrangements of the drops was the same as is indicated in FIG. 3. It may also be noted that in each case the coated pigments were of comparable particle size (as reported already in Examples 27 to 30 above).

In line with the results seen in Examples 27 to 30, the samples of Examples 31 and 33 (prepared using the coated pigment of Example 1) can be seen to consistently perform as well as or better than the samples of Examples 32 and 34 (prepared using the commercial PCU 1000) in terms of chemical resistance (with each of the samples, superior results can be seen in the early stages of the test using 1 M sodium hydroxide (NaOH)), but also to have superior optical appearance in terms of brightness and distinction of image.

Examples 35 and 36—A Further Comparison with a Commercial Product

To further illustrate the present invention, and also demonstrate the difference between the coated pigments of the invention and the commercial coated pigment PCU 1000 (discussed in Example 29 above), both coated pigments were compared in a further test carried out in accordance with the "Test method for measuring chemical resistivity of coated pigments" set out above, and images of the samples following the testing are reproduced in FIG. 3. The two samples in FIG. 3 were prepared in the same way and differed only in terms of the coated pigment used. The Inventive Example (referred to below as Example 35) was prepared using the coated pigment of Example 1. The Comparative Example (referred to below as Example 36) was prepared using the PCU 1000 coated pigment.

In line with the results seen in Examples 27 to 34, the sample of Example 35 can be seen to perform significantly better than the sample of Example 36 in terms of chemical resistance. The sample of Example 35 can also be seen to have superior optical appearance, as evidenced by the brightness and distinction of image.

Examples 37 and 38—A Further Comparison with a Commercial Product

Corresponding drawdown samples prepared using a liquid coating made by dispersing 0.5 g of pigment in 9.5 g of waterborne paint (obtainable from Plantag Coatings with Article number 74254.X) using a magnetic stirrer. This was done using (i) the coated pigment of Example 1 as the pigment (this is the sample labelled MA35-13 74524.X in FIG. 6 and will be referred to below as Example 37), and (ii) the commercial coated pigment PCU 1000 which was discussed in Example 29 above (this is the sample labelled PCU1000 WC and will be referred to below as Example 38). The samples differed only in terms of the identity of the coated pigment.

In line with the results seen in Examples 27 to 36, the sample of Example 37 can be seen to perform significantly better than the sample of Example 38 in terms of chemical resistance. The sample of Example 37 can also be seen to have superior optical appearance, as evidenced by the brightness and distinction of image.

Examples 39 and 40—Minimum Ignition Energy (MIE) Testing

First, as Example 39, the coated pigment of Example 15 as described above was subjected to MIE testing. Second, as Example 40, the MIE was tested for a coated pigment wherein the coating was applied in the same way as in Example 15 as described above, but using different Al substrate flakes, namely ones having a $d_{50}$ of around 10 μm. Both coated pigments were prepared from substrate particles having a surface area of around 7 m$^2$/g.

MIE was measured according to BS ISO/IEC 80079-20-2.

The coated pigments of Examples 39 and 40 were both found to have an MIE of between 10 and 20 mJ. This compares favourably with, for example, the commercially available coated pigments PCU1000 ($d_{50}$=15 μm, MIE reported as ≥3 and ≤10 mJ) and PCUplus 800 ($d_{50}$=8 μm, MIE reported as ≥1 but ≤3 mJ).

Example 41—Gassing Stability

Examples 41A to 41C—Measurement of Gassing Stability of Coated Pigments in Accelerated Gassing Test Method Metal pigments can react with water to produce hydrogen. For instance, Al pigments can react with water as per the The reaction flask should be washed with a small amount of 1 Molar hydrochloric acid before being re-used, in order to remove deposits that may form during the reaction (residues on the glass can affect future results).

Example 41A

Reactants:
Initial feed: 140 g aluminium paste, 70% in mineral spirit (98 g in terms of solids content), $d_{50}$ 8-20 μm
First layer application: 30 g tetraethylsilicate (TEOS) 0.2 g 3-glycidyloxypropyltrimethoxysilane
Second layer application: 15 g TEOS 0.5 g 3-glycidyloxypropyltrimethoxysilane
Surface treatment part A: 0.8 g alcohol-etherified melamine-formaldehyde resin in isobutanol (amount refers to the amount of resin)
Surface treatment part B: 2.7 g oleic acid
Processing:

| Step | Description | Time/comments |
|---|---|---|
| 1 | The initial feed + 600 g 1-methoxy-2-propanol solvent + first layer ingredients were loaded into a reactor, and stirred | 15 minutes room temperature 30 min reflux |
| 2 | 2.03 g MEA + 43 water were added over three portions; stirring and reflux continued | 3 hr/pH maintained at 9-10 |
| 3 | The second layer ingredients were added; stirring and reflux continued | 1 hr |
| 4 | Aqueous solution of MEA was added (total MEA added was 1 g); stirring and reflux continued | 3 hr |
| 5 | Surface treatment part A and part B ingredient was added; stirring and reflux continued | 1 hr |
| 6 | The product was cooled, the solvent removed by filtration, and the cake washed with 0.1 kg 1-methoxy-2-propanol; the product was then dried in an oven at 85° C. | Filtrate: yellow, clear pH 8-9 Yield: 154 g | formula: $2Al+6H_2O \rightarrow 2Al(OH)_3+3H_2$. The reaction proceeds faster with acidic or alkaline solutions. The extent of evolution of $H_2$ can be used to measure the gassing stability of a coated pigment. An accelerated gassing method may be used in this regard, more details of which follow below.

Test Method for Measuring Gassing Stability of Coated Pigments
(a) weigh 0.5 g of pigment in paste form into a 250 ml conical flask (amount refers to non-volatile content);
(b) measure 10 ml of butyl glycol and add it to the paste;
(c) place a magnetic stirrer bar into the flask, and set it in a water bath at 29° C.;
(d) stir the mixture at 250 rpm until it is fully dispersed, monitoring the temperature of the dispersion with an electronic thermometer probe;
(e) once the mixture has been fully dispersed and has equilibrated at 29° C., using a measuring cylinder add 50 ml of sodium hydroxide/butyl glycol solution preheated to 29° C. to the dispersion (to prepare the sodium hydroxide/butyl glycol solution, weigh 5.00 g of sodium hydroxide into a 1 litre flask, add 500 g of deionised water, then add 5.00 g of butyl glycol, then add a further 490 g of deionised water, then stir until fully dissolved);
(f) take a bubble counter that is filled with 30 ml of water, (quickly) attach the bubble counter head to the flask, and simultaneously start an electronic timer; and
(g) stop the timer once all of the water has been displaced from the bottom chamber of the bubble counter.

Example 41B

A coated pigment was prepared in the same way as in Example 41A, subject to using 2.0 g of octylphosphonic acid as surface treatment part B. The filtrate in Step 6 was yellow, clear pH 8-9. The product yield was 158 g.

Example 41C

A coated pigment was prepared in the same way as in Example 41A, subject to using 1.0 g of 3-aminopropyltriethoxysilane as surface treatment part A and 2.0 g of octylphosphonic acid as surface treatment part B. The filtrate in Step 6 was yellow, clear pH 8-9. The product yield was 153 g.

Samples of Examples 41A to 41C were tested according to the "Test method for measuring gassing stability of coated pigments" procedure outlined above. A commercially available coated pigment product sold by Eckart under the name Hydrolan 2156 was also tested (for comparison). The time was recorded for the samples to generate 30 ml hydrogen.

Accelerated Gassing Test Results:

| Sample | Reaction time (s) |
|---|---|
| Hydrolan 2156 | 669 |
| Example 41A | 3425 |

-continued

| Sample | Reaction time (s) |
|---|---|
| Example 41B | 1588 |
| Example 41C | 1480 |

Examples 41D and 41E—Measurement of Gassing Stability of Coated Pigments in Extended Gassing Test Method Coated pigments may also be tested according to an extended gassing test method involving the steps set out below, and using the apparatus depicted in FIG. 7 (for the avoidance of doubt, the test set out below is not the "Test method for measuring gassing stability of coated pigments" as referenced elsewhere herein):

Extended Gassing Test Method 10.0 g of pigment is added to 10.0 g of a 1:1 mixture of propylene glycol methyl ether/1-methoxy-2-propanol (available commercially as Dowanol PM) and propylene glycol n-butyl ether (available commercially as Dowanol PnB) in a 400 ml beaker using a palette knife to make a smooth, creamy dispersion containing no lumps (butyl glycol can be used as a possible alternative to the combination of the two mentioned ethers). To the resulting mixture is added 200 g of a solution which can be made by (i) mixing 3 parts acrylic emulsion (available commercially as Joncryl 537 resin dispersion) to 1 part distilled water in a beaker, and (ii) fast stirring using a mechanical paddle stirrer. The resulting mixture is then stirred for 10 minutes using a magnetic stirrer. 200 g of the resultant mixture is then added to a 200 ml cylindrical flask, making sure none of the paint goes on to the neck joint, where this connects to the Ledde head (the Ledde head is prepared by transferring water into the bottom chamber via the central glass tube in the top chamber using a pipette, the water level in the bottom drical flask by slowly twisting home (note that water will be displaced from the bottom chamber up the central tube towards/into the top chamber indicating a good seal between the two). A quickfit joint clamp is then applied. The screw cap on top is then tightened before being loosened back one quarter turn to allow a slight vent. The oven door is then closed and the temperature allowed to stabilise for a further 10 minutes. After this time, the door is quickly opened, the gas rig removed, and any displaced water in the top chamber of the Ledde head pipetted off. The cap is then (loosely) replaced and the rig put back in the oven, from which point gas evolution is measured. Visual checks can be done through internal glass door of incubator without disturbing paint temperature. Final gas evolution can be measured by unscrewing the Ledde head cap and pipetting any displaced water from the top chamber into a pre-tared beaker. The weight of water removed is expressed in ml.

Examples 41D and 41E—Measurement of Gassing Stability of Coated PVD Pigments in Extended Gassing Test Method Example 41D Reactants:

Initial feed: 170.0 g aluminium paste, 10% in 1-methoxy-2-propanol (solids content 17 g), $d_{50}$ 6-15 μm First layer application: 6.0 g tetraethylsilicate (TEOS)
0.2 g 3-glycidyloxypropyltrimethoxysilane Second layer application: 3 g TEOS
0.4 g 3-glycidyloxypropyltrimethoxysilane Surface treatment part A: 0.7 g alcohol-etherified melamine-formaldehyde resin in isobutanol (amount refers to the amount of resin)

Surface treatment part B: 0.8 g octylphosphonic acid

Processing:

| Step | Description | Time/comments |
|---|---|---|
| 1 | The initial feed + 550 g 1-methoxy-2-propanol solvent + first layer ingredients were loaded into a reactor, and stirred | 15 minutes room temperature 30 min reflux |
| 2 | 3.5 g MEA + 70 water were added over three portions; stirring and reflux continued | 3 hr/pH maintained at 9-10 |
| 3 | The second layer ingredients were added; stirring and reflux continued | 1 hr |
| 4 | Aqueous solution of MEA was added (total MEA added was 1.3 g); stirring and reflux continued | 3 hr |
| 5 | Surface treatment part A and part B ingredient was added; stirring and reflux continued | 1 hr |
| 6 | The product was cooled, the solvent removed by filtration, and the cake washed with 0.1 kg 1-methoxy-2-propanol; the product was then dried in an oven at 85° C. | Filtrate: yellow, clear pH 8-9 Yield: 186 g | chamber being just below the neck of the tube). The cap on the Ledde head is then replaced and closed loosely. The Ledde head and (filled) cylindrical flask are then placed in an oven pre-set to 52° C. (it is preferred to use separate ovens, ideally incubator ovens). The temperature is then allowed to stabilise—the stabilisation temperature is 2 hours if the paint is in an incubator oven, or 3 hours if the paint is in a convection oven. At this 2 (or 3) hour re-zero point, the Ledde head is removed from the oven (closing the oven door after removal to minimise heat loss) and some silicon based grease is applied to the tapered base. The (2nd) oven door is then opened and the Ledde head is connected to the cylin- Example 41E A coated pigment was prepared in the same way as in Example 41D, subject to using 0.4 g of 3-aminopropyltriethoxysilane as surface treatment part A. The filtrate in Step 6 was yellow, clear pH 8-9. The product yield was 180 g.

Samples of Examples 41D and 41E were tested according to the extended gassing test procedure outlined above. A commercially available coated pigment product sold by Eckart under the trade name HYDROSHINE WS3003 was also tested (for comparison). The results after 5 and 21 days are set out below.

| Sample | Gassing Result (ml) | |
| --- | --- | --- |
| | 5 Days | 21 days |
| HYDROSHINE WS3003 | 2.3 | 18.4 |
| Example 41D | 0.6 | 0.6 |
| Example 41E | 0 | 0 |

The invention claimed is:

1. A method of coating a substrate, the method consisting of:

(a) a step of reacting a mixture consisting of an inorganic network former and an organofunctional network former in a condensation-type reaction, optionally in the presence of a solvent, to form a reaction product on the substrate, and subsequently:

(b) one or more further steps of reacting a mixture consisting of an inorganic network former and an organofunctional network former in a condensation-type reaction in the presence of the reaction product from step (a) and optionally in the presence of a solvent, wherein the organofunctional network former used in the method consists of one or more compounds of formula (II):

$$R^1_i R^2_j R^3_k SiX_{(4-i-j-k)} \tag{II}$$

wherein each of i, j and k is independently 0 or 1, provided that at least one of i, j and k is 1, each of $R^1$, $R^2$ and $R^3$ is independently an organic group, provided that at least one of $R^1$, $R^2$ and $R^3$ is a reactive organic group, and each X is independently an optionally hydrolyzable and/or condensable group selected from the group consisting of halogen, —OH, —OR', or —Y, and/or one pair of X moieties together represent a divalent chelating ligand, wherein each $R^7$ is independently an organic group, and each Y is independently —(O—$R^4$—O—Si($R^5$)$_m$ (X')$_{2-m}$—)$_n$$R^6$, wherein each $R^4$ is independently a divalent organic group, each $R^5$ is independently an organic group, each m is independently 0, 1 or 2, each X' is independently an optionally hydrolyzable and/or condensable group selected from halogen, —OH, or —OR$^7$, and/or one or more pairs of geminal X' moieties together represent a divalent chelating ligand, wherein each $R^7$ is independently an organic group, n is 1 to 10, and $R^6$ is an organic group.

2. A method according to claim 1, wherein part (b) consists of one or two further steps in which an inorganic network former and an organofunctional network former are subjected to a condensation-type reaction.

3. A method according to claim 1, wherein the substrate is a metal or metal oxide.

4. A method according to claim 1, wherein the substrate is a metal pigment.

5. A method according to claim 1, wherein the substrate comprises, or is, an aluminium, bronze, copper or zinc pigment.

6. A method according to claim 5, wherein the substrate is an aluminium pigment and the proportion of aluminium is ≥99% by weight based on the total weight of the uncoated aluminium pigment.

7. A method according to claim 1, wherein the inorganic network former is a compound of formula (I):

$$MX_n \tag{I}$$

wherein

M is Si, Al, Ti, Zr, B, Fe, Mg, Mn, Sb, Cr, Zn and/or Ce, each X is independently an optionally hydrolysable and/or condensable group selected from halogen, —OH, or —OR, and/or one, two or three pairs of X moieties together represent a divalent chelating ligand, wherein each R group is a C1-10 alkyl group in which the carbon chain is optionally interrupted by one or more heteroatoms selected from N, O and S, and n is an integer from 2 to 6 and corresponds to the oxidation state of M.

8. A method according to claim 7, wherein
M is Si, Al, Ti, Zr or Fe,
each X is C1-6 alkoxy, and
n is 2, 3 or 4.

9. A method according to claim 7, wherein
M is Si,
X is methoxy or ethoxy, and
n is 4.

10. A method according to claim 1, wherein each reactive organic group is, independently, a hydrocarbyl group having one or more substituents selected from epoxy, amino, hydroxyl, thiol, acrylate, methacrylate, vinyl, allyl, alkenyl, alkynyl, carboxyl, carboxylic anhydride, isocyanate, cyanate, ureido and carbamate.

11. A method according to claim 1, wherein the organofunctional network former is selected from:

3-aminopropyltrimethoxysilane,
3-aminopropyltriethoxysilane,
N-(n-butyl)-3-amino-propyltrimethoxysilane, N-(n-butyl)-3-amino-propyltriethoxysilane,
N-2-aminoethyl-3-aminopropyl(methyl)dimethoxysilane, N-2-aminoethyl-3-aminopropyl(methyl) diethoxysilane,
N-2-aminoethyl-3-aminopropyltrimethoxysilane, N-2-aminoethyl-3-aminopropyltriethoxysilane,
3-glycidyloxypropyltriethoxysilane,
3-glycidyloxypropyltrimethoxysilane,
3-mercaptopropyltrimethoxysilane,
3-mercaptopropyltriethoxysilane,
3-methacryloxypropyltrimethoxysilane,
3-methacryloxypropyltriethoxysilane,
3-ureidopropyltrimethoxysilane, and
3-ureidopropyltriethoxysilane.

12. A method according to claim 1, wherein:

the inorganic network former in each of step (a) and (b) is, independently, a tetraalkoxysilane, the organofunctional network former in step (a) is an epoxysilane or an aminosilane, and the organofunctional network former in step (b) is an epoxysilane.

13. A method according to claim 1, wherein the substrate is a metal pigment, and the coated metal pigment or coated metal oxide pigment has a value of at least 40 mJ·m$^2$/g for MIE*surface area, wherein MIE is the minimum ignition energy and the surface area is the surface area as measured by the BET method.

14. A method according to claim 1, wherein the substrate is a pigment having (i) a $d_{50}$ value of ≤30 μm and (ii) an average aspect ratio of at least 100.

15. A method comprising:

applying one or more surface modifiers to the coated substrate produced by the method of claim 1, wherein the substrate is a pigment.

16. A method according to claim 15, wherein said one or more surface modifiers include (a) both (i) an organophosphorous compound, and (ii) a compatibilizer having a molecular weight of 5,000 or less, and wherein the organophosphorous compound and compatibilizer are applied simultaneously, separately or sequentially;

(b) both (i) a fatty acid, and (ii) a compatibilizer having a molecular weight of 5,000 or less, and wherein the fatty acid and compatibilizer are applied simultaneously, separately or sequentially; or (c) both (i) an organofunctional network former, and (ii) an organophosphorous compound and wherein the organofunctional network former and organophosphorous compound are applied simultaneously, separately or sequentially.

17. A method according to claim 15, wherein said one or more surface modifiers include both (i) an organophosphorous compound, and (ii) a compatibilizer having a molecular weight of 5,000 or less, and wherein the organophosphorous compound and compatibilizer are applied simultaneously, separately or sequentially.

18. A method according to claim 17, wherein the organophosphorus compound is a compound of formula (III):

$$\text{I-X-P (O)(OR}^1\text{)(OR}^2\text{)} \qquad \text{(III)}$$

$R^1$ and $R^2$ are each independently H, optionally substituted hydrocarbyl, optionally substituted amine, polyether, an ammonium ion, an alkali metal, or an alkaline earth metal;

X is divalent and is (a) a straight or branched hydrocarbon chain, said hydrocarbon chain being optionally interrupted by one or more heteroatoms selected from O, S and N, (b) an optionally substituted carbocyclic ring, wherein said ring is selected from cycloalkyl, cycloalkenyl, aryl and a fused carbocyclic group, or (c) an optionally substituted heterocyclic ring including one or more heteroatoms selected from O, S and N; and Iis H or an initiator moiety for polymerization.

19. A method according to claim 18, wherein $R^1$ and $R^2$ are H;

X is $C_{4-14}$ alkylene; and

I is H.

20. A method according to claim 17, wherein the compatibilizer is a melamine resin, an isocyanate resin, a polyurethane resin or an acrylic resin.

21. A method according to claim 17, wherein the compatibilizer is a $C_{1-4}$ alcohol-etherified melamine-formaldehyde resin or an isophorone diisocyanate trimer resin.

22. A method according to claim 16, wherein said one or more surface modifiers include both (i) a fatty acid, and (ii) a compatibilizer having a molecular weight of 5,000 or less, wherein the fatty acid and compatibilizer are applied simultaneously, separately or sequentially, the fatty acid is a compound of formula R—C(O) OH wherein R is an alkyl or alkenyl group having 3 to 29 carbons, and the compatibilizer is a melamine resin, an isocyanate resin, a polyurethane resin or an acrylic resin.

23. A method according to claim 16, wherein said one or more surface modifiers include both (i) an organofunctional network former, and (ii) an organophosphorous compound, wherein the organofunctional network former and organophosphorous compound are applied simultaneously, separately or sequentially, the organofunctional network former is an aminoalkyltrialkoxysilane, and the organophosphorous compound is a compound of formula (III):

$$\text{I-X-P(O)(OR}^1\text{)(OR}^2\text{)} \qquad \text{(III)}$$

wherein $R^1$ and $R^2$ are each independently H, optionally substituted hydrocarbyl, optionally substituted amine, polyether, an ammonium ion, an alkali metal, or an alkaline earth metal;

X is divalent and is (a) a straight or branched hydrocarbon chain, said hydrocarbon chain being optionally interrupted by one or more heteroatoms selected from O, S and N, (b) an optionally substituted carbocyclic ring, wherein said ring is selected from cycloalkyl, cycloalkenyl, aryl and a fused carbocyclic group, or (c) an optionally substituted heterocyclic ring including one or more heteroatoms selected from O, S and N; and I is H or an initiator moiety for polymerization.

24. A method according to claim 15, the method comprising simultaneously, separately or sequentially applying one or more surface modifiers to the pigment, wherein said one or more surface modifiers (a) include an organophosphorous compound and a compatibilizer having a molecular weight of 5,000 or less, and wherein a major part of the compatibilizer does not become covalently bonded to the pigment; (b) include a fatty acid and a compatibilizer having a molecular weight of 5,000 or less, and wherein a major part of the compatibilizer does not become covalently bonded to the pigment; or (c) include an organofunctional network former and an organophosphorous compound.

25. A method according to claim 15, the method comprising simultaneously, separately or sequentially applying one or more surface modifiers to the pigment, wherein said one or more surface modifiers (a) include an organophosphorous compound and a compatibilizer having a molecular weight of 5,000 or less, and wherein a major part of the compatibilizer does not become covalently bonded to the pigment.

26. A method according to claim 25, which comprises a step of applying the organophosphorous compound to the pigment, and subsequently a step in which the compatibilizer is applied to the pigment.

27. A method comprising:

coating a substrate by a method as defined in claim 1, wherein the substrate is a pigment, optionally subsequently applying one or more surface modifiers to the coated substrate, further processing the coated pigment into a product comprising the coated pigment which product is a varnish, automobile finish, paint, printing ink, powder coating material, architectural paint, plastic, security printing ink, ceramic, glass or cosmetic agent, or an article which a varnish, automobile finish, paint, printing ink, powder coating material, architectural paint, plastic, security printing ink, ceramic, glass or cosmetic agent has been applied to or incorporated within.

28. A method according to claim 27, wherein the product is a powder coating material which further comprises a polymer.

29. A method according to claim 27, wherein the product is an aqueous coating composition.

30. A method according to claim 29, wherein the pigment (a) has on its surface an organofunctional network former and an organophosphorus compound, and/or (b) is obtained or obtainable by a method comprising simultaneously, separately or sequentially applying one or more surface modifiers to the pigment, wherein said one or more surface modifiers include an organofunctional network former and an organophosphorus compound.

31. A method according to claim 30, wherein the pigment is obtainable by a method of coating a pigment substrate and then applying one or more surface modifiers to the coated pigment substrate, wherein the method of coating the pigment substrate comprises (a) a step of subjecting an inorganic network former and an organofunctional network former to a condensation-type reaction, and subsequently (b) one or more further steps in which an inorganic network former and an organofunctional network former are subjected to a condensation-type reaction; and in the step of applying one or more surface modifiers to the (thus obtained) coated pigment substrate, said one or more surface modifiers include both (i) an organofunctional network former, and (ii) an organophosphorus compound.

32. A method according to claim 27, wherein the product is a powder coating material, and the method comprises electrostatically applying the powder coating material to an article, and, optionally, curing the applied coating material.

33. A method according to claim 32, wherein the article is an automobile.

\* \* \* \* \*